United States Patent
Uchiyama et al.

(10) Patent No.: US 6,204,944 B1
(45) Date of Patent: Mar. 20, 2001

(54) ALL-OPTICAL TIME-DIVISION DEMULTIPLEXING CIRCUIT AND ALL-OPTICAL TDM-WDM CONVERSION CIRCUIT

(75) Inventors: Kentaro Uchiyama; Satoki Kawanishi; Masatoshi Saruwatari, all of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/115,721

(22) Filed: Jul. 15, 1998

(30) Foreign Application Priority Data

Jul. 18, 1997 (JP) .................................. 9-194218

(51) Int. Cl.$^7$ ...................................... H04J 14/02
(52) U.S. Cl. ............................ 359/123; 359/127; 359/124
(58) Field of Search ................................. 359/122, 123, 359/127, 138

(56) References Cited

U.S. PATENT DOCUMENTS

| | | | |
|---|---|---|---|
| 5,357,359 | * 10/1994 | Uchiyama et al. | 359/123 |
| 5,589,969 | * 12/1996 | Taga et al. | 359/124 |
| 5,631,758 | 5/1997 | Knox et al. | 359/127 |
| 6,023,360 | * 2/2000 | Morioka et al. | 359/123 |

FOREIGN PATENT DOCUMENTS

| | | |
|---|---|---|
| 4-19718 | 1/1992 | (JP) . |
| 8-110534 | 4/1996 | (JP) . |
| 8-195732 | 7/1996 | (JP) . |
| 8-307391 | 11/1996 | (JP) . |
| 9-15661 | 1/1997 | (JP) . |

* cited by examiner

Primary Examiner—Leslie Pascal
Assistant Examiner—Dalzid Singh
(74) Attorney, Agent, or Firm—Pennie & Edmonds LLP

(57) ABSTRACT

An all-optical time-division demultiplexing circuit is designed to output all the channels of time-division multiplexed signal pulses to different output ports simultaneously. A pulse stream of time-division multiplexed signal pulses and linearly chirped control pulses synchronized with the signal channels are input into an optical Kerr medium. The optical Kerr medium provides locally cross-phase modulation to the control pulse, depending on the presence or absence of the signal pulses of each signal channel. And the optical Kerr medium modulates the power of the component frequencies $v_1, v_2, \ldots, v_N$ of the control pulses in accordance with each of the signal channel, by inducing the optical frequency shift to compensate the control pulse chirp on the optical frequency axis. The Kerr medium outputs a power modulated control light, which is separated in a wavelength-division demultiplexing circuit into component frequencies $v_1, v_2, \ldots, v_N$ of the control pulses which are to output to respective ports of corresponding to individual signal channels.

16 Claims, 28 Drawing Sheets

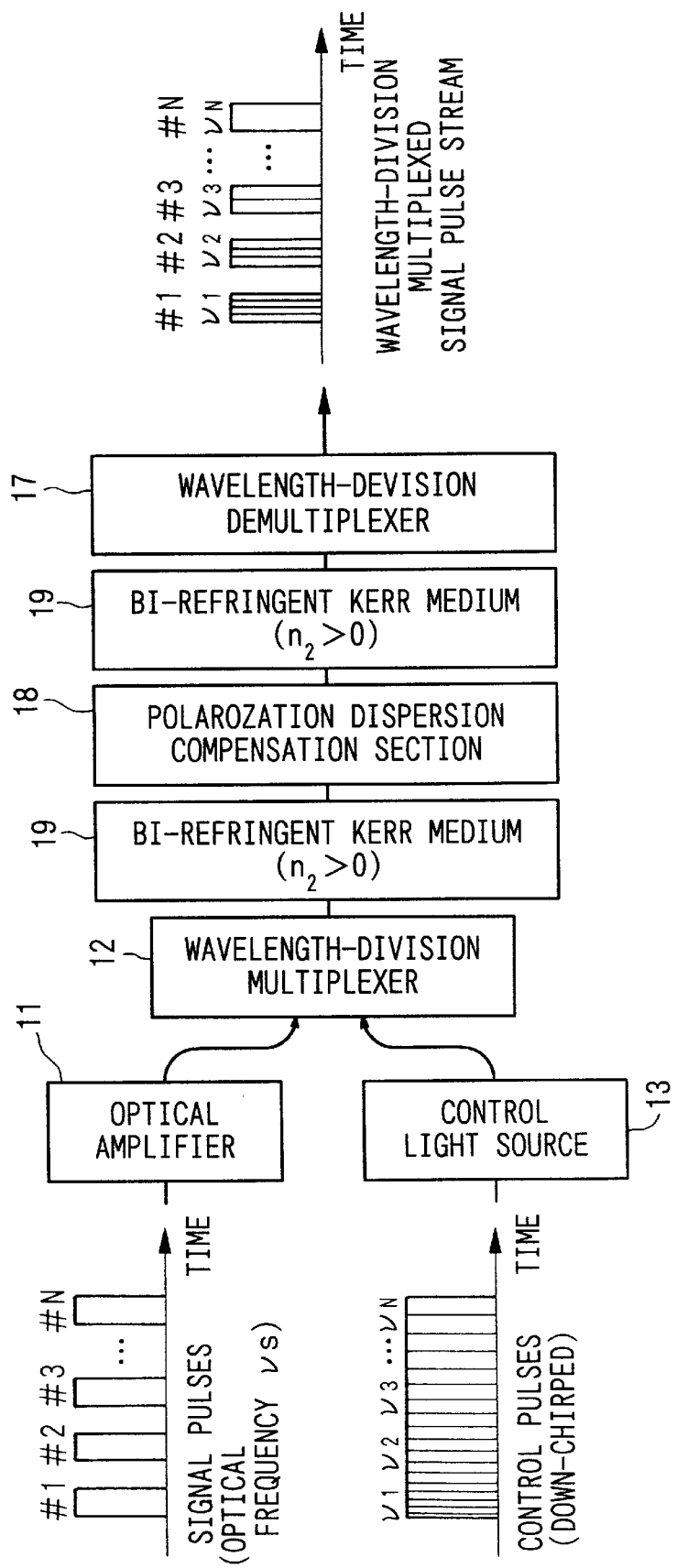

US 6,204,944 B1

ALL-OPTICAL TIME-DIVISION DEMULTIPLEXING CIRCUIT AND ALL-OPTICAL TDM-WDM CONVERSION CIRCUIT

BACKGROUND OF THE INVENTION

1. Field of the Invention

The present invention relates to a multi-channel output type all-optical time-division demultiplexing circuit which separates an optical pulse stream of a time-division multiplexed (TDM) signal, and simultaneously outputs every channel of the TDM signal to different ports. The present invention relates also to an all-optical TDM-WDM(Time-Division-Multiplexed-Wavelength-Division-Multiplexed) conversion circuit for assigning different wavelengths to each channel of time-division multiplexed signal pulse stream input from a transmission line, and outputting a stream of wavelength-division multiplexed signal pulses to another transmission line.

This application is based on patent application No.Hei09-194218 filed in Japan, the content of which is incorporated by reference.

2. Description of the Related Art

FIG. 18 shows a first configuration of the conventional all-optical time-division demultiplexing circuit (FIGS. 5 and 6 from a Japanese Patent Application, First Publication, H4-19718 (Patent Application No. H2-125176). Utilizing a fact that when time division multiplexed signals and control pulses are launched into an optical Kerr medium, signal pulses are affected by cross-phase modulation effect of the control pulses, resulting in changes in the center frequency, thus enabling the signal pulses to be demultiplexed into individual channels of the TDM signal.

In FIG. 18, time-division multiplexed signal pulses $P_1$, $P_2$, $P_3$, $P_4$ of an optical frequency $\upsilon s$ are input into a wavelength-division multiplexer 1 and are multiplexed with a control pulse Pc of an optical frequency of $\upsilon c$ and launched into an optical Kerr medium 3 having a positive nonlinear-index coefficient. In the Kerr medium 3, the center frequencies of the signal pulses are altered by the cross-phase modulation effect of the control pulse. The process of mutual interaction is illustrated in FIG. 19.

In a Kerr medium 3 of a positive nonlinear-index coefficient, cross-phase modulation of the control pulse induces a phase shift 4 in the signal pulses. The phase shift 4 is power-dependent (i.e., proportional to the intensity shape of the control pulse) and is derived by time-differentials of the control pulse intensity interacting with the signal pulses to produce optical frequency shift 5 in the signal pulses. If the so-called "up-chirp" region is utilized, where the optical frequency increases approximately linearly (refer to shaded region in FIG. 19, corresponding to the central region of the control pulse waveform), the signal pulses $P_1$, $P_2$, $P_3$, $P_4$ of an optical frequency $\upsilon s$ are changed into corresponding signal pulses having different optical frequencies $\upsilon_1$, $\upsilon_2$, $\upsilon_3$, $\upsilon_4$.

Such signal pulses $P_1$, $P_2$, $P_3$, $P_4$ having different frequencies can be separated in the optical wavelengh-division demultiplexer 2 into individual optical frequencies, and can be output to respective output ports at the same time, providing an all-optical time-division demultiplexing circuit.

FIG. 20 illustrates a second configuration of the conventional all-optical time-division demultiplexing circuit disclosed in FIGS. 1 and 3 of a Japanese Patent Application, First Publication, H7-160678. In this device, time-division multiplexed signal pulses and chirped control pulses are input into a nonlinear optical loop mirror (Sagnac interferometer) based on Kerr medium 3, and the control pulse, phase-shifted by the cross-phase modulation effect in the Kerr medium, is demultiplexed to be output to individual channels of the TDM signal.

In FIG. 20, a control light source 7 is connected to an input port 6A of an optical coupler 6, and the output ports 6C, 6D are connected in a loop by way of an optical wavelength-division multiplexer 1 and a Kerr medium 3, and an optical wavelength-division demultiplexer 2 is connected to an input port 6B.

Time-division multiplexed signal pulses $P_1$, $P_2$, $P_3$, . . . , $P_N$ of an optical frequency $\upsilon s$ are input, through an optical amplifier 8, into the wavelength multiplexer 1. Control light source 7 produces a control pulse Pc which is linearly chirped, and whose pulse duration is sufficient to include the signal pulses $P_1$, $P_2$, $P_3$, . . . , $P_N$. The control pulse Pc is launched into input port 6A of the optical coupler 6 to be divided into two signals which are output from output ports 6C, 6D and propagates through the loop in opposite directions, as clockwise (c) component and a counter-clockwise (cc) component. In the meantime, signal pulses launched into the loop from the optical wavelength-division multiplexer 1 propagates clockwise. In the Kerr medium 3, the phase of the clockwise control pulse, propagating with the clockwise signal pulses, is affected by the cross-phase modulation effect with the signal pulses. Therefore, when the c-control pulse and cc-control pulse is multiplexed again in the optical coupler 6, the control pulse, overlapped by the signal pulses and having a phase difference of $\pi$, is output from the input port 6B.

Accordingly, signal pulses $P_1$, $P_2$, $P_3$, . . . , $P_N$ modulate corresponding control pulses $P_{C1}$, $P_{C2}$, $P_{C3}$, . . . , $P_{CN}$. These control pulses $P_{C1}$, $P_{C2}$, $P_{C3}$, . . . , $P_{CN}$ are shifted in the order of the corresponding optical frequencies $\upsilon_1$, $\upsilon_2$, $\upsilon_3$, . . . , $\upsilon_N$, thereby enabling to be separated in the wavelength demultiplexer 2 into individual optical frequencies. In other words, time-division multiplexed signals are separated into each channel, thereby enabling the all-optical time-division demultiplexing circuit to output demultiplexed signal pulses to different output ports simultaneously.

FIG. 21 illustrates a third configuration of the conventional all-optical time-division demultiplexing circuit disclosed in FIGS. 6 and 7 of a Japanese Patent Application, First Publication, H7-208258, (Priority Patent Application No. H6-191645). In this circuit, time-division multiplexed signal pulses and chirped control pulses are input into a non-linear optical medium, and the TDM signal pulses, produced as a result of four-wave-mixing, are demultiplexed.

In FIG. 21, time-division multiplexed signal pulses $P_1$, $P_2$, $P_3$, . . . , $P_N$ of an optical frequency $\upsilon s$ are input into a wavelength-division multiplexer 1. The control light source 7 produces a light whose optical frequency changes monotonically with time, and generates a control pulse Pc of a duration sufficiently long to include signal pulses $P_1$, $P_2$, $P_3$, . . . , $P_N$. Signal pulses $P_1$, $P_2$, $P_3$, . . . , $P_N$ and the control pulse Pc are multiplexed in the wavelength-division multiplexer 1 and are launched into a non-linear optical medium 9.

Here, optical frequency components of the control pulse Pc synchronized with the signal pulses $P_1$, $P_2$, $P_3$, . . . , $P_N$ of an optical frequency $\upsilon s$ are designated by $\upsilon_1$, $\upsilon_2$, $\upsilon_3$, . . . $\upsilon_N$. In this case, four-wave-mixing effect is induced in the non-linear optical medium 9 by the control pulse Pc interacting with signal pulses of different optical frequencies, and generates frequency-converted optical pulse Fi of an optical frequency $\upsilon_{Fi}$ (=2$\upsilon$s−$\upsilon$i) or an optical pulse Fi' of an optical frequency $\upsilon_{Fi'}$(=2$\upsilon$i−$\upsilon$s), where i=1, 2,3, . . . ,N.

Accordingly, frequency-converted pulses $F_1$, $F_2$, $F_3$, . . . , $F_N$ or $F_1'$, $F_2'$, $F_3'$, . . . , $F_N'$ are generated to correspond to signal pulses $P_1$, $P_2$, $P_3$, . . . , $P_N$, and each frequencies can be separated with a wavelength-division demultiplexer 2. In other words, an all-optical time-division demultiplexing circuit is produced that enables time-division multiplexed signals to be separated into each signal channel and output to different output ports at the same time.

The first and third circuit configurations of the all-optical time-division demultiplexing circuit shown above are also shown in a Japanese Patent Application, First Publication, H8-307391 (Patent Application No. H7-129633) as "related arts" in FIG. 6, and as "elements of the invention" in FIGS. 1 and 2.

Problems with the conventional demultiplexing circuits are outlined below.

In the first circuit configuration shown in FIGS. 18 and 19, the only useful region of the control pulse waveform is the central region where the optical frequency increases approximately monotonically with time, therefore, it is not possible to separate those time-division multiplexed pulse signals which are processed outside of the effective chirp duration. Also, because attempts are made to produce a high degree of phase shift by using a control pulse having a wide pulse width, it means that the optical power has to be quite high, requiring several watts up to several tens of watts (refer to Electron, Lett., vol. 28, pp. 1070–1071, 1992). Furthermore, separated optical pulses are produced by shifting the signal pulse frequency so that signal pulses having the original frequency are not generated.

In the second circuit configuration shown in FIG. 20, it is necessary to construct a non-linear optical loop mirror (Sagnac interferometer), which is more complex compared with other conventional circuits in which the signal pulses and control pulses are propagated in one direction in an optical Kerr medium.

In the third circuit configuration shown in FIG. 21, because the output light is a result of four-wave-mixing of signal pulses and control pulses, there are conversion losses associated with the generation efficiency of four-wave-mixing process, resulting in a high insertion loss. Also, because there is a large shift in the bandwidths between the control/signal pulses and the four-wave-mixing pulses, it introduces another problem that a wide optical bandwidth is required to achieve time-division demultiplexing.

SUMMARY OF THE INVENTION

It is an object of the present invention to provide an all-optical time-division demultiplexing circuit for time-division multiplexed optical pulses to provide efficient performance in a simple circuit structure, using small optical power, so that all the channels are output simultaneously to respective ports without expanding the bandwidth. An application of the circuit is demonstrated in a conversion circuit to convert time-division multiplexed signals to wavelength-division multiplexed signals.

The all-optical time division demultiplexing circuit of the present invention multiplexes ① a pulse stream of time-division multiplexed signal pulses comprising of N channels (>2) having an optical frequency $\upsilon$s and ② a control pulse synchronized with a signal channel of the time-division multiplexed pulse stream, monotonically chirped with time having an optical frequency different from $\upsilon$s, having a duration including N signal channels and having a same repetition as the signal channel, and input the result to an optical Kerr medium.

The Kerr medium produces cross-phase modulation locally between the chirped control pulse and the signal pulses to produce local optical phase shift in a time-base depending on the presence or absence of signal pulse of each signal channel of time-division multiplexed signal channels, and an optical frequency shift which compensates the control pulse chirp on the optical frequency axis.

This results in modulation of intensity of light with optical frequencies of $\upsilon_1$, $\upsilon_2$, . . . , $\upsilon_N$ of control pulse corresponding to each signal channel. The intensity of light is modulated, separates control pulse with optical frequencies of $\upsilon_1$, $\upsilon_2$, . . . , $\upsilon_N$ corresponding to each signal channel and outputs them to the ports corresponding to each optical frequencies.

The optical pulse stream input into the Kerr medium is given a signal power amplification sufficient to enable a signal pulse stream to induse cross-phase modulation on the control pulse (claim 2).

The principle of power modulation in the optical Kerr medium by inducing cross-phase modulation on the control pulse depending on the presence or absence of the signal pulse, modulating the intensity of control pulse by making an optical frequency shift to compensate the control pulse chirp on the frequency axis. In the explanation below, the optical Kerr medium is assumed to have a positive nonlinear-index coefficient (claim 3).

As shown in FIG. 2, signal pulse has a Gaussian waveform of intensity vs. time, and the control pulse has a rectangular waveform of intensity vs. time. In this case, the control pulse is a down-chirped pulse whose frequency decreases monotonically ($\upsilon_L > \upsilon_T$) from a leading end ($\upsilon_L$) to a trailing end ($\upsilon_T$) as shown in FIG. 4A. The frequency of the control pulse is $\upsilon_0$ for peak signal power at time $t_0$.

At this time, optical frequency of control pulse is shifted as shown in FIG. 3B, by the cross-phase modulation of signal pulse as shown in FIG. 3A. In other words, in the center region of the signal pulse (shaded region shown in FIG. 3B), the control pulse receives an approximately linear increase by time in optical frequency (up-chirped on time-base) as illustrated in FIG. 3B. By this, down-chirp of the control pulse is compensated by the up-chirp effect (increasing intensity) of the signal pulse on the frequency-base, as illustrated in FIG. 4C, and it results in causing those control pulse optical frequencies superimposed in the vicinity of the center of the signal pulse to shift to the center frequency $\upsilon_0$, and ultimately producing an increase of the spectral power as illustrated in FIG. 4D.

FIGS. 4A, 4B show a time-resolved optical spectrum of the control signal and a power distribution of the optical spectrum with non-optical-frequency-shifted by signal pulse. FIGS. 4C, 4D show a time-resolved optical spectrum of the control signal and a power distribution of the optical spectrum with optical-frequency-shifted by the signal pulse.

As shown in FIGS. 4B, 4D, the control pulse power of optical frequency $\upsilon_0$ is either $P_1$ or $P_0$, depending on whether there is a pulse or not to interact with. Therefore, filtering the control pulse through a bandpass filter, which transmits light of optical frequencies in the vicinities of the center optical frequency $\upsilon_0$, enables to produce a pulse light whose optical power has been modulated depending on whether a signal pulse has been imposed or not.

FIG. 5 shows optical power vs. time waveforms for a control pulse and a stream of five channels of time-division multiplexed signal pulses, binary coded as "11101". In this case, the control pulses are repeated at a rate of ⅕ of the time-division multiplexed signal pulses. The peak power for individual signal channels #1~#5 occurs at $t_1$~$t_5$, and the corresponding control pulse frequencies are $\upsilon_1$~$\upsilon_5$, respectively.

The control pulse spectral power is modulated according to the phase modulation pattern "11101" of the pulse stream of time-division multiplexed signal pulses, as shown in FIGS. 6A, 6B. Therefore, individual signal channels #1~#5 can be separated and extracted by filtering the modulated pulses through bandpass filters which transmit optical frequencies near $\upsilon_1$~$\upsilon_5$.

It should be noted that the above explanation relates to a case of a Kerr medium having a positive nonlinear-index coefficient, and the control pulse is a down-chirped pulse in which the optical frequency decreases monotonically from the leading end to the trailing end of a pulse (claim 3). On the other hand, if the Kerr medium has a negative nonlinear-index coefficient, the control pulse should be an up-chirped pulse such that the frequency monotonically increases from the leading end to the trailing end (claim 4). Furthermore, if the Kerr medium is a bi-refringent medium, the circuit includes two orthogonal principal axes as a polarization mode dispersion compensation device, and the control light is provided with polarized light whose polarization components in the two orthogonal directions have an equal optical power (claim 5). The polarization mode dispersion compensation device may be made of two bi-Kerr media (=bi-refringent Kerr media) of an equal length connected in series in such a way that the two principal axes are at right angles (claim 11). An example of such a device is shown in FIG. 24, which shows a bi-Kerr media (bi-refringent media) 60, 61 in series. A λ/2 plate may be inserted between the bi-Kerr media (claim 13). An example of this device is shown in FIG. 25, which shows a λ/2 plate between bi-Kerr media 60, 61. Or, a Faraday rotator may be inserted between the two bi-Kerr media (claim 15). An example is shown in FIG. 26, which shows a 90-degree Faraday rotator between the bi-Kerr media 60, 61. In such an arrangement, light propagated through the ordinary-axis and the extraordinary-axis of the bi-Kerr medium 60 are made to travel through the extraordinary-axis and the ordinary-axis of the bi-Kerr medium 61, and the overall propagation delay difference will be zero.

Also, in the present invention, all-optical time-division demultiplexing circuit outputs the pulse stream with optical frequencies of $\upsilon_1$, . . . , $\upsilon_5$ to each port, on the other hand all-optical TDM-WDM conversion circuit outputs the wavelength-division multiplexed signal pulses to a port by multiplexing pulses of each optical frequencies again (claims 6–9). In the TDM-WDM conversion circuit, if the Kerr medium is a bi-refringent medium, the circuit includes two orthogonal principal axes as a polarization mode dispersion compensation device, and the control light is provided with polarization state whose polarization components in the two orthogonal directions have an equal optical power (claim 10). The polarization mode dispersion compensation device may be made of two bi-Kerr media of an equal length connected in series in such a way that the two principal axes are at right angles (claim 12). An example of such a device is shown in FIG. 24, which shows a bi-Kerr media 60, 61 in series. A λ/2 plate may be inserted between the bi-Kerr media (claim 14). An example of this device is shown in FIG. 25, which shows a λ/2 plate between bi-Kerr media 60, 61. Or, a Faraday rotator may be inserted between the two bi-Kerr media (claim 16). An example is shown in FIG. 26, which shows a 90-degree Faraday rotator between the bi-Kerr media 60, 61. In such an arrangement, light propagated through the ordinary-axis and the extraordinary-axis of the bi-Kerr medium 60 are made to travel through the extraordinary-axis and the ordinary-axis of the bi-Kerr medium 61, and the overall propagation delay difference will be zero.

Also, as illustrated in FIG. 4D, because optical frequency components in the vicinities of $\upsilon_0$ are converted to $\upsilon_0$, the optical powers of these optical frequency components ($\upsilon_0 \pm \delta$) are decreased. When there is a signal pulse, although the optical powers of the optical frequency components in the vicinities of $\upsilon_0$ are increased, the optical power of the optical frequency components in the vicinities of the ($\upsilon_0 \pm \delta$) are decreased. Therefore, by filtering those waves in the vicinities of ($\upsilon_0 + \delta$) or ($\upsilon_0 - \delta$) with bandpass filters, a pulse stream, comprised of logical inversion pulses with respect to time-division multiplexed input signal pulses, can be generated. Especially, when the repetition rates of the signal pulses and the control pulses are the same, all-optical inverting circuit is produced.

As explained above, all-optical time-division demultiplexing circuit enables to separate signal channels comprising the time-division multiplexed pulse stream simultaneously. The present circuit configuration enable to significantly facilitate clock synchronization of control and signal pulses, compared with a circuit configuration comprised of series- or parallel-connection of optical gating circuits. Also, a significantly simplified structure of the circuit enables to reduce insertion loss, thereby enabling to reduce the noise factor (NF) of the time-division demultiplexing circuit. This increases the overall noise margin in the optical communication system to be increased, and provides an effective increase in distance and reliability of the information transmission system.

The present all-optical time-division demultiplexing circuit is able to separate time-division multiplexed pulses into N signal channels as explained above, but it is also able to convert the signal wave of single optical frequency to multiple optical frequencies of the chirped control pulse. Therefore, by outputting input signal pulses without separation, the circuit can function as a TDM-WDM conversion circuit also.

BRIEF DESCRIPTION OF THE DRAWINGS

FIG. 29 is a schematic diagram of a second embodiment of the all-optical TDM-WDM conversion circuit of the present invention.

DESCRIPTION OF THE PREFERRED EMBODIMENTS

Figure 1:
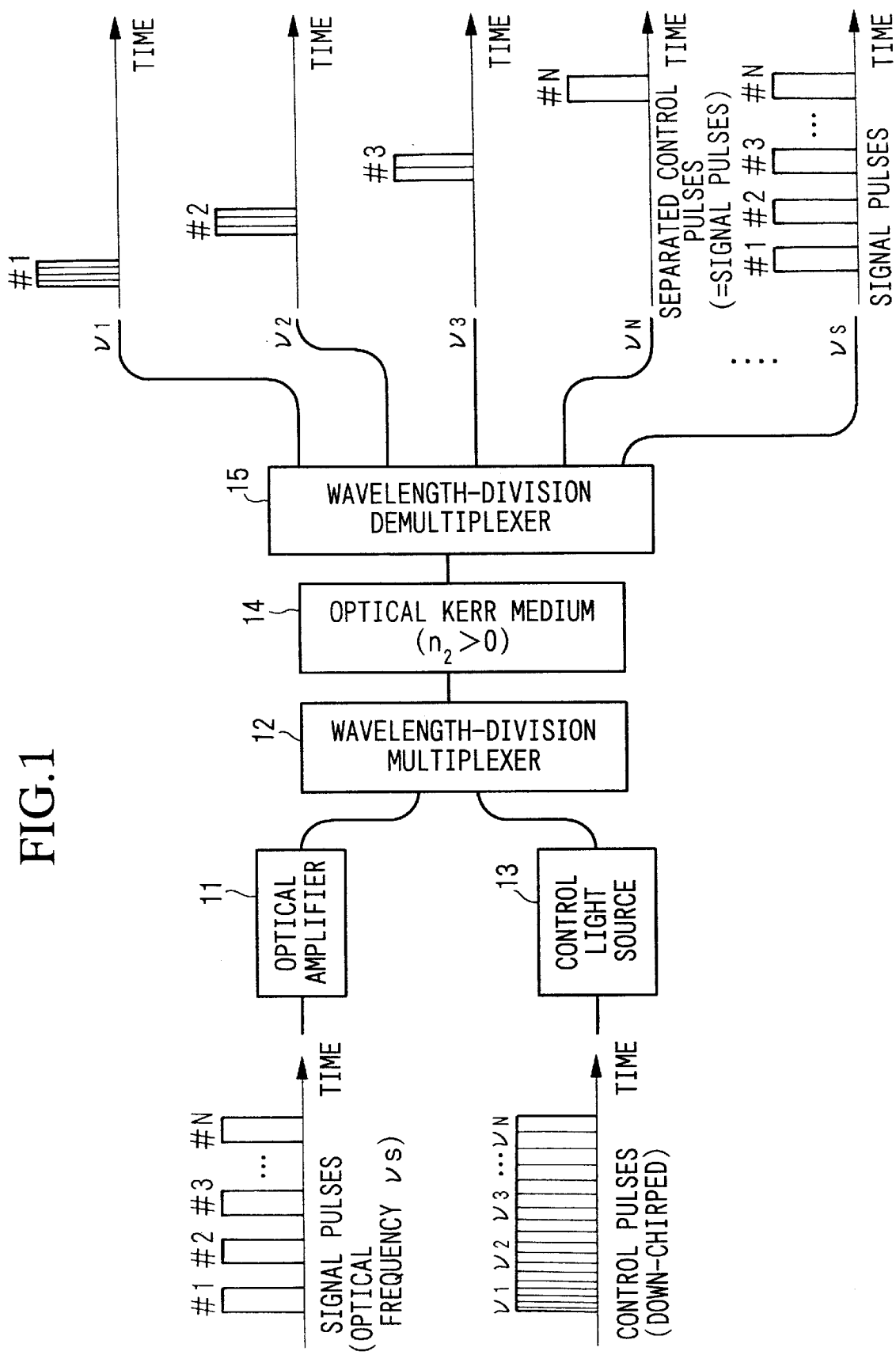
FIG. 1 is a schematic diagram of a first embodiment of the all-optical time-division demultiplexing circuit.
Figure 2:
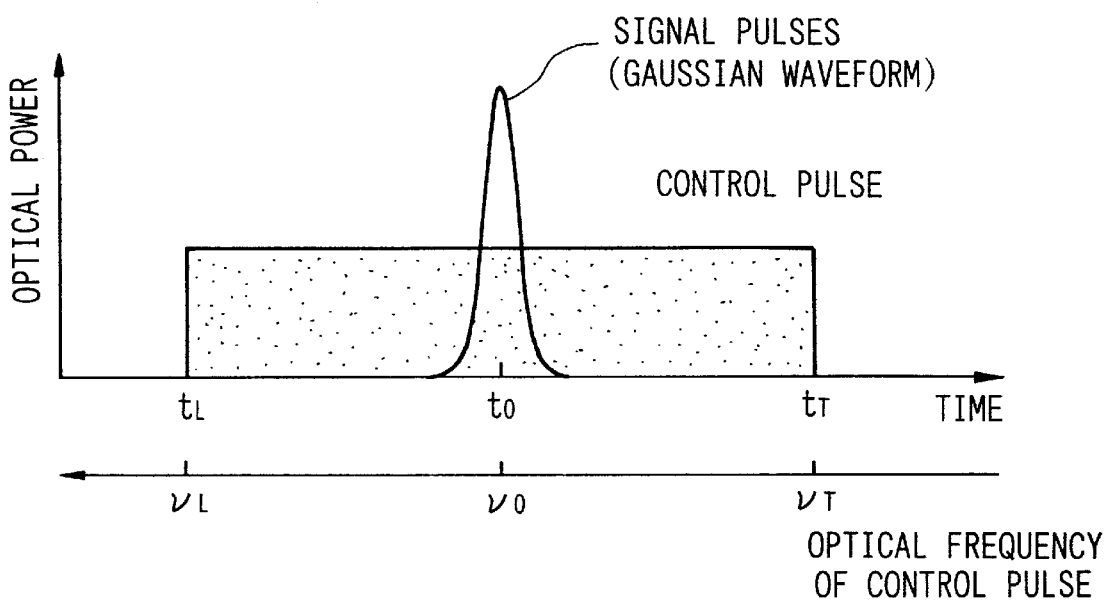
FIG. 2 is an illustration of the positional relation on the time base of signal pulses and the control pulse.
Figure 3A:
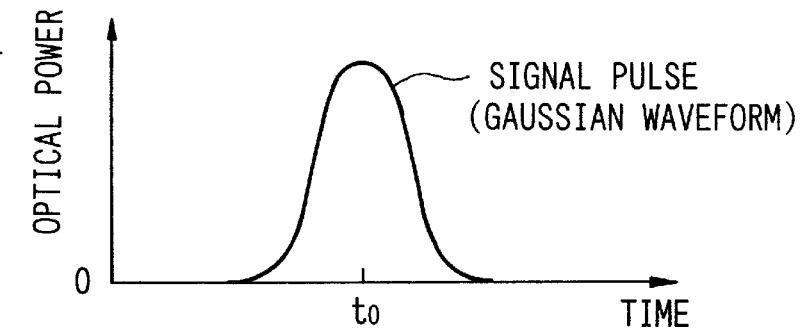
FIGS. 3A and 3B are illustrations of optical frequency shift induced by cross-phase modulation of a Gaussian waveform signal pulse with a control pulse.
Figure 3B:
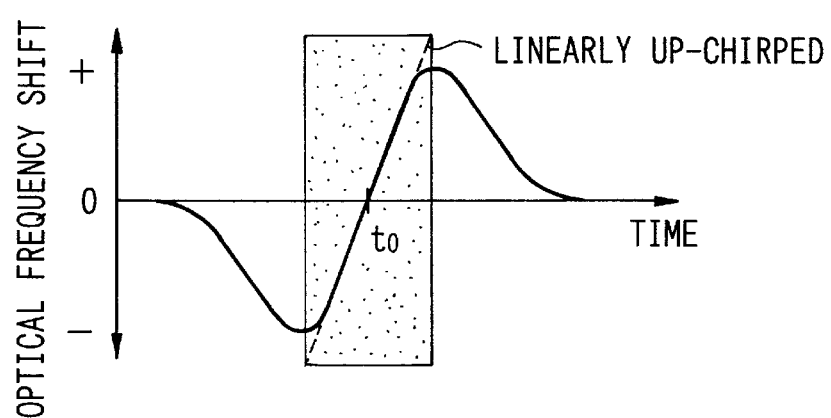
Figure 4C:
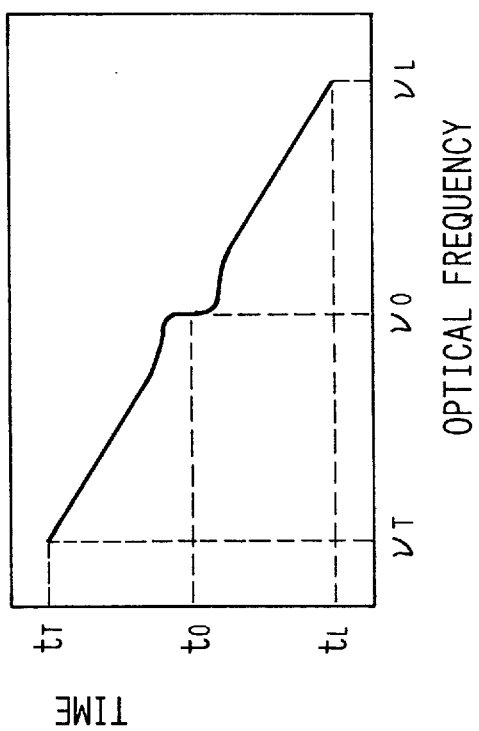
FIGS. 4A~4D are time-resolved spectra and spectral power distribution of the control pulse.
Figure 4D:
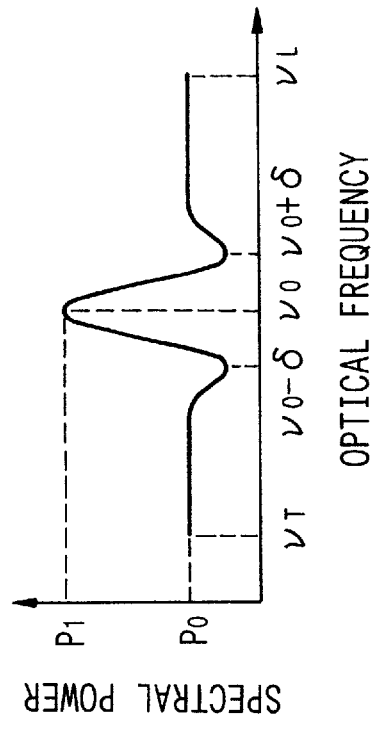
Figure 4A:
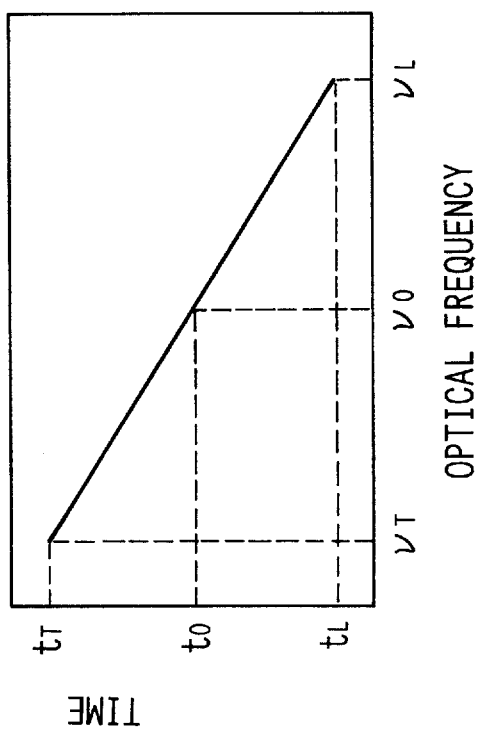
Figure 4B:
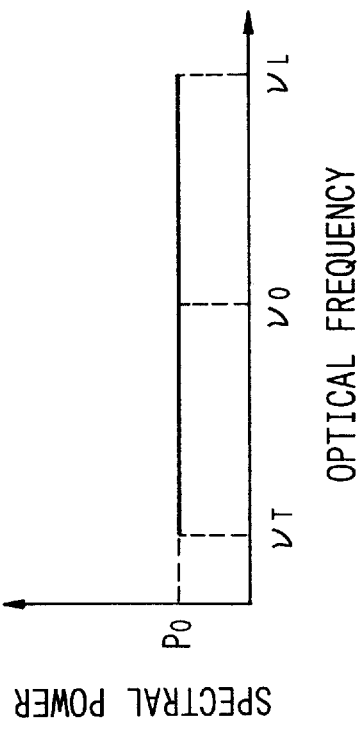
Figure 5:
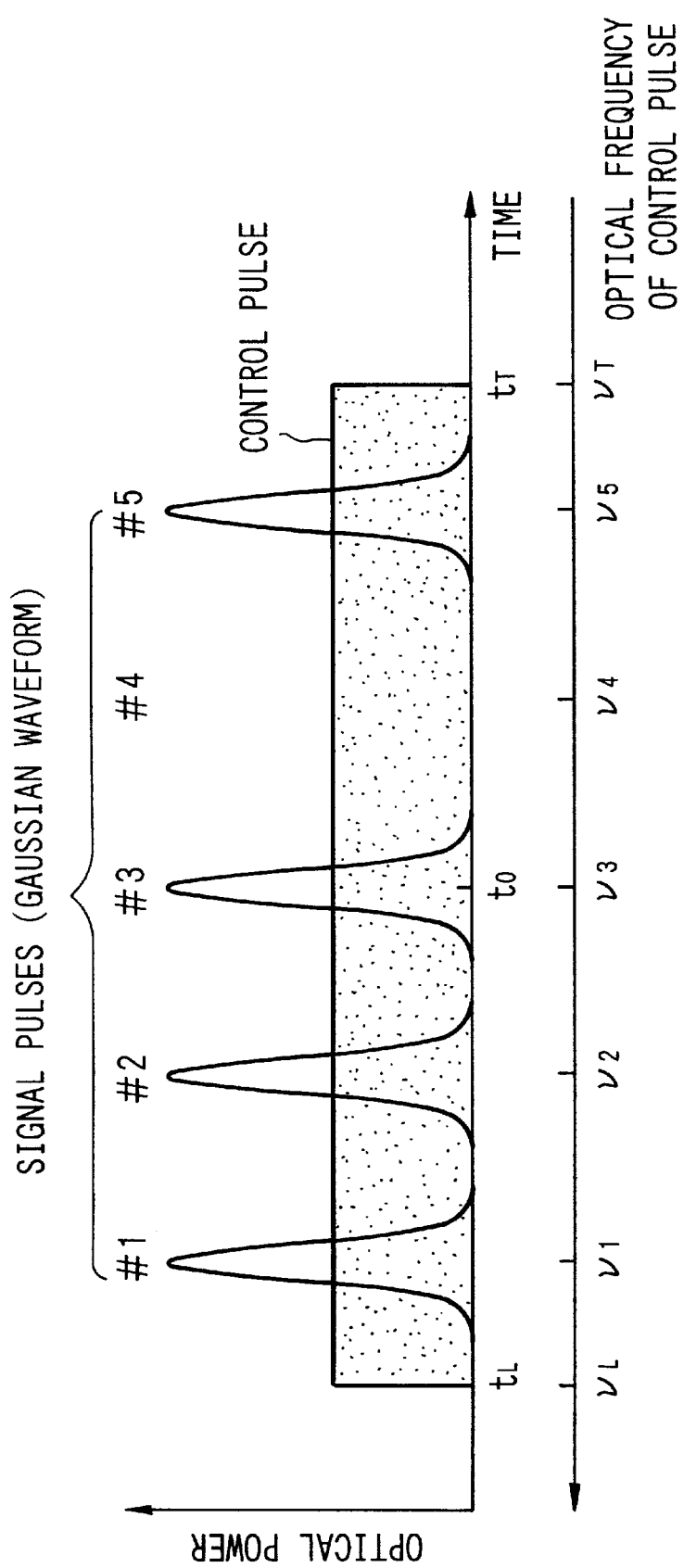
FIG. 5 is an illustration of the positional relation on the time base of the control pulse to a binary bit stream "11101" of time-division multiplexed signal pulses.

Preferred embodiments will be presented in the following udder two headings:

I. All Optical Time-Division Demultiplexing circuits; and
II. All Optical TDM-WDM Conversion Circuits I. Time-Division Demultiplexing Circuits Embodiment 1 of Time-division Demultiplexing Circuits FIG. 1 is a schematic circuit diagram of Embodiment 1 of the all-optical time-division demultiplexing circuit.

A stream of time-division multiplexed signal pulses, of an optical frequency $\upsilon s$, produced by time-division multiplexing the signal channels #1 to #N, is input through an optical amplifier 11 to a wavelength-division multiplexer 12. A control light source 13 generates a down-chirped control pulse $(\upsilon_1 > \upsilon_2 > \ldots > \upsilon_N)$ having monotonically decreasing optical frequencies from its leading end to its trailing end, at the same repetition rate as the signal channels, and inputs it into the optical wavelength-division multiplexer 12.

The wavelength-division multiplexer 12 multiplexes received pulses so that the signal channels #1, #2, #3, . . . , #N and the control pulse with optical frequencies of $\upsilon_1, \upsilon_2, \upsilon_3, \ldots, \upsilon_N$ will be superimposed upon one another on the same time base, and outputs the multiplexed pulses to an optical optical Kerr medium 14. Optical Kerr medium 14 has a positive nonlinear-index coefficient, and, as explained above, intensity-dependent modulation effect is produced such that cross-phase modulation of the time-division multiplexed signal pulses on the control pulse causes a series of frequency shift in the control pulse. The result is that spectral components of the control pulses with center optical frequencies, $\upsilon_1, \upsilon_2, \upsilon_3, \ldots, \upsilon_N$ are intensity-modulated by the signal pulses in the respective channels #1, #2, #3, . . . , #N.

Modulated control pulses propagated through the optical Kerr medium 14 are input into a wavelength-division demultiplexer 15, and the spectral components in the vicinities of the optical frequencies $\upsilon_1, \upsilon_2, \upsilon_3, \ldots, \upsilon_N$ are demultiplexed, and are separately output to respective output ports. It should be noted that it is permissible to output time-division multiplexed pulse stream of optical frequency $\upsilon s$, at the same time.

Figure 7:
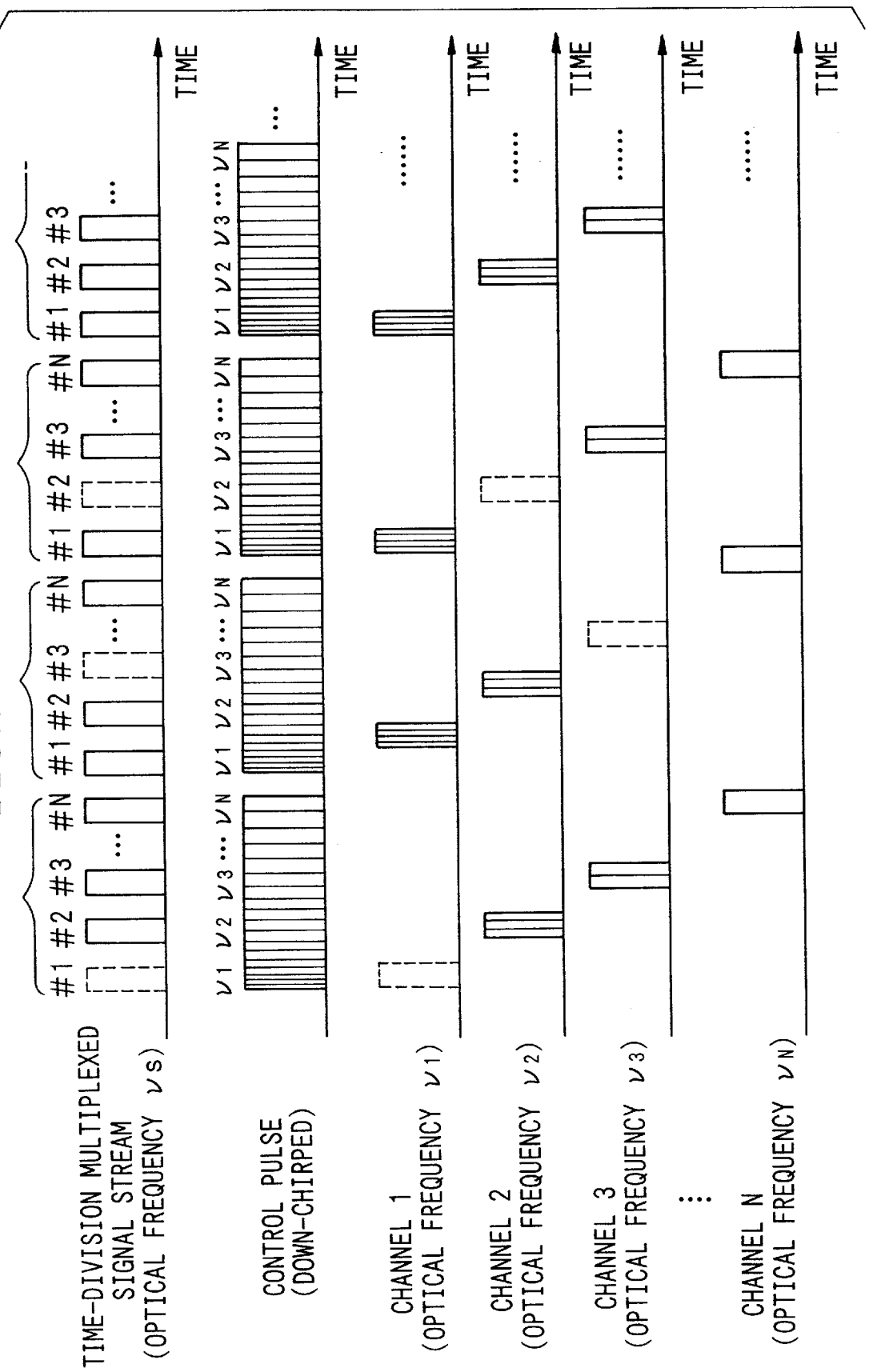
FIG. 7 is an illustration of the positional relation on the time base of control pulses to a stream of time-division mutiplexed signal pulses in the all-optical time-division demultiplexing circuit of the present invention.

FIG. 7 shows positional relations of a time-division multiplexed signal pulse stream to the control pulses on the time base in the all-optical time-division demultiplexing circuit of the present invention. Here, the time-division multiplexed signal pulse stream (of optical frequency $\upsilon s$) is represented by "011 . . . 1", "110 . . . 1", and "101 . . . 1". Signal channel of Channel #1 (of optical frequency $\upsilon_1$) is separated as "011 . . . " and others are separated in the same manner.

Figure 8A:
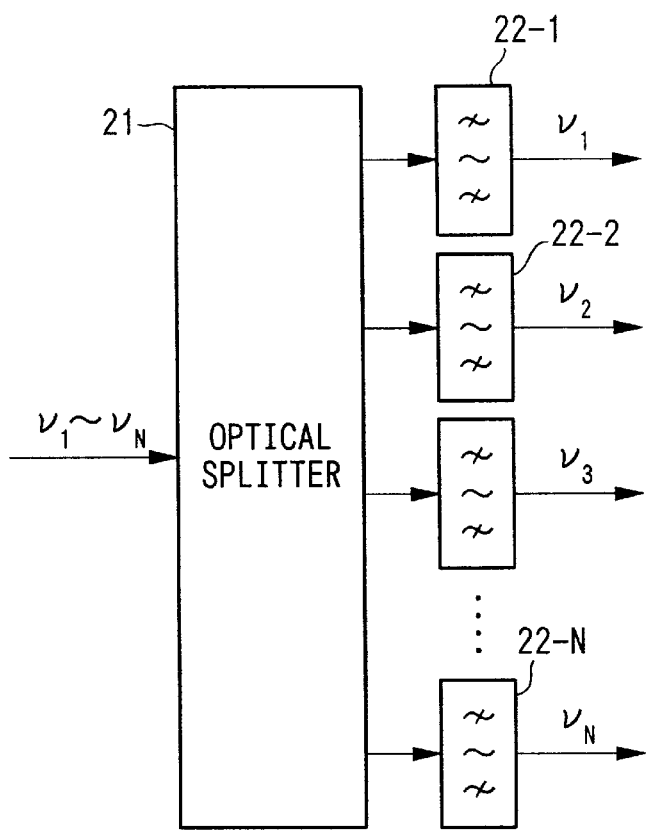
FIGS. 8A~8C are schematic diagrams of the configuration of a 1×N wavelength-division demultiplexer 15.
Figure 8B:
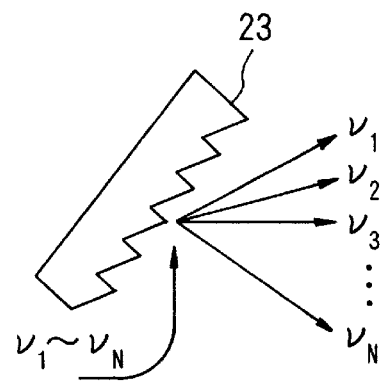
Figure 8C:
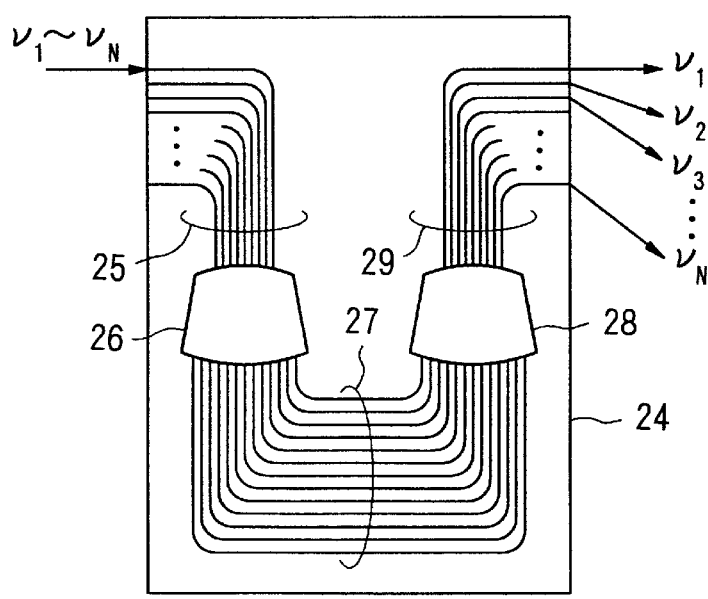

FIGS. 8A~8C show examples of 1×N wavelength-division demultiplexer 15, which divides one input signal into N output signals.

A wavelength-division multiplexer shown in FIG. 8A comprises an optical splitter 21 which splits one input light into N branches, and optical bandpass filters 22-1~22-N of respective optical frequencies $\upsilon_1, \upsilon_2, \upsilon_3, \ldots, \upsilon_N$.

A wavelength-division demultiplexer shown in FIG. 8B comprises a reflection grating 23.

A wavelength-division demultiplexer shown in FIG. 8C comprises an arrayed waveguide grating 24. An arrayed waveguide grating 24 comprises: input waveguides 25; a slab waveguide 26; arrayed waveguides (adjacent waveguides differ in optical path length by $\Delta L$) 27; a slab waveguide 28; and output waveguides 29. A light distributed to the arrayed waveguides 27 through input waveguides 25 and slab waveguide 26 assumes different phase relations after passing through the arrayed waveguides 27, and has different focusing points in the slab waveguide 28 depending on the individual optical frequencies. Therefore, each waveguide in the output waveguides 29 carries signals of different optical frequencies, thereby providing a means for producing a wavelength demultiplexing function.

Figure 9:
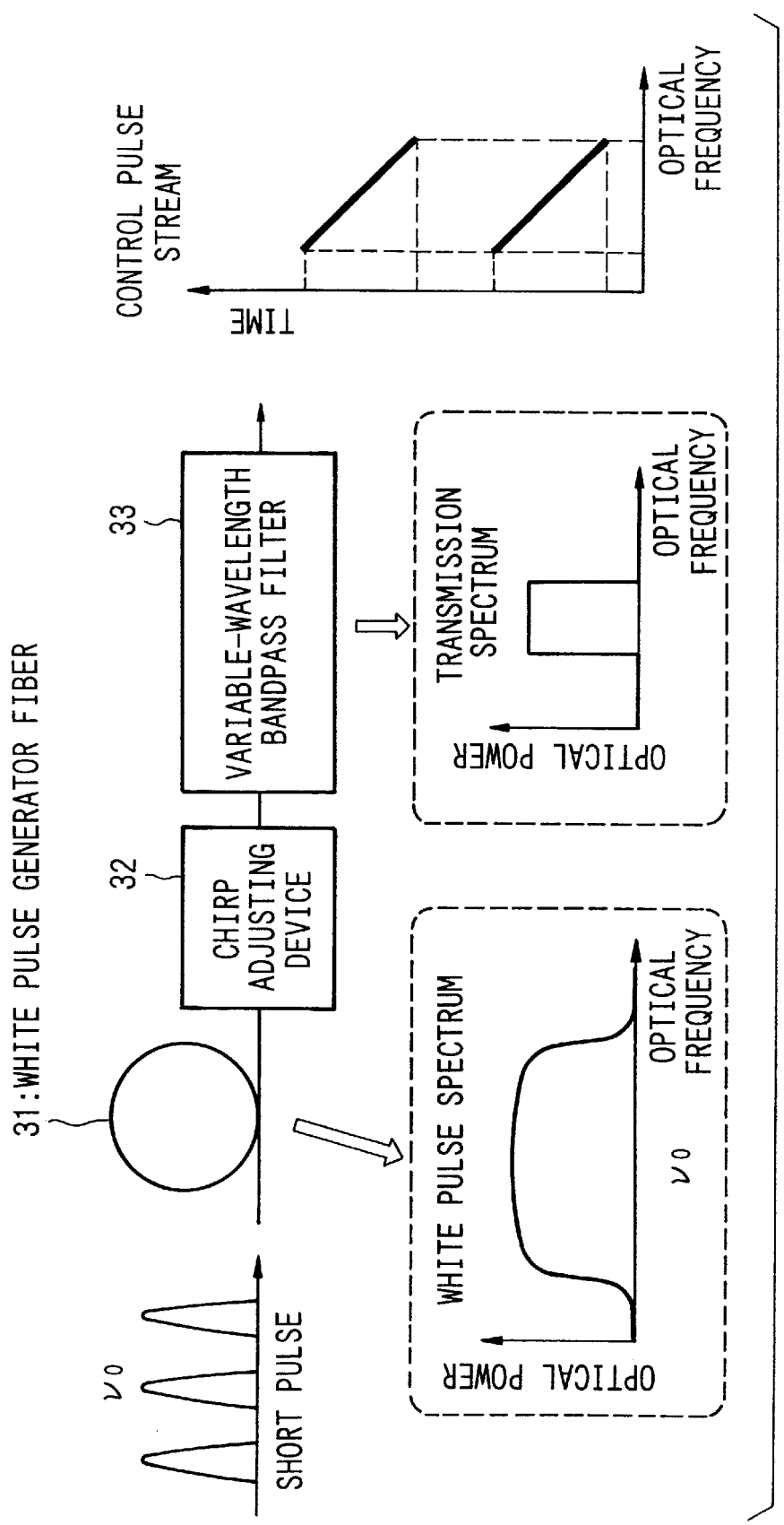
FIG. 9 is a first configuration of a control light source 13 to generate a stream of linearly chirped control pulses.

FIG. 9 shows a first example of the control light source 13 which produces a pulse stream of linearly chirped control pulses.

The light source 13 comprises connecting a white pulse generator fiber 31, a chirp adjusting device 32; variable-wavelength bandpass filter 33. Injection of a short pulse (optical frequency $\upsilon_0$) into the white pulse generator fiber 31 causes a wideband white pulse (center optical frequency $\upsilon_0$) to be generated. For example, if a short pulse of several pico-seconds having a peak power of 2~3 W is launched into a white pulse generator fiber 31 of 1 km length, a white pulse having a spectral width in excess of 200 nm is produced.

The variable-wavelength bandpass filter 33 has a transmission coefficient which outputs a rectangular-shaped spectrum, and demultiplexing of white light input through the chirp adjusting device 32 produces a stream of control pulses having a wide time span and linear chirp characteristics. Also, by altering the center transmission wavelength within the white pulse wavelengths, it is possible to produce a linearly chirped control pulse stream of any optical frequencies. Chirp adjusting device 32 adjusts the absolute value and sign of chirp according to its dispersion properties. For example, if a zero-dispersion fiber at 1.3 $\mu$m is used for the chirp adjusting device 32, because anomalous dispersion values are approximately constant in the 1.55 $\mu$m band, control pulses having linear chirp characteristics are obtained.

Figure 10:
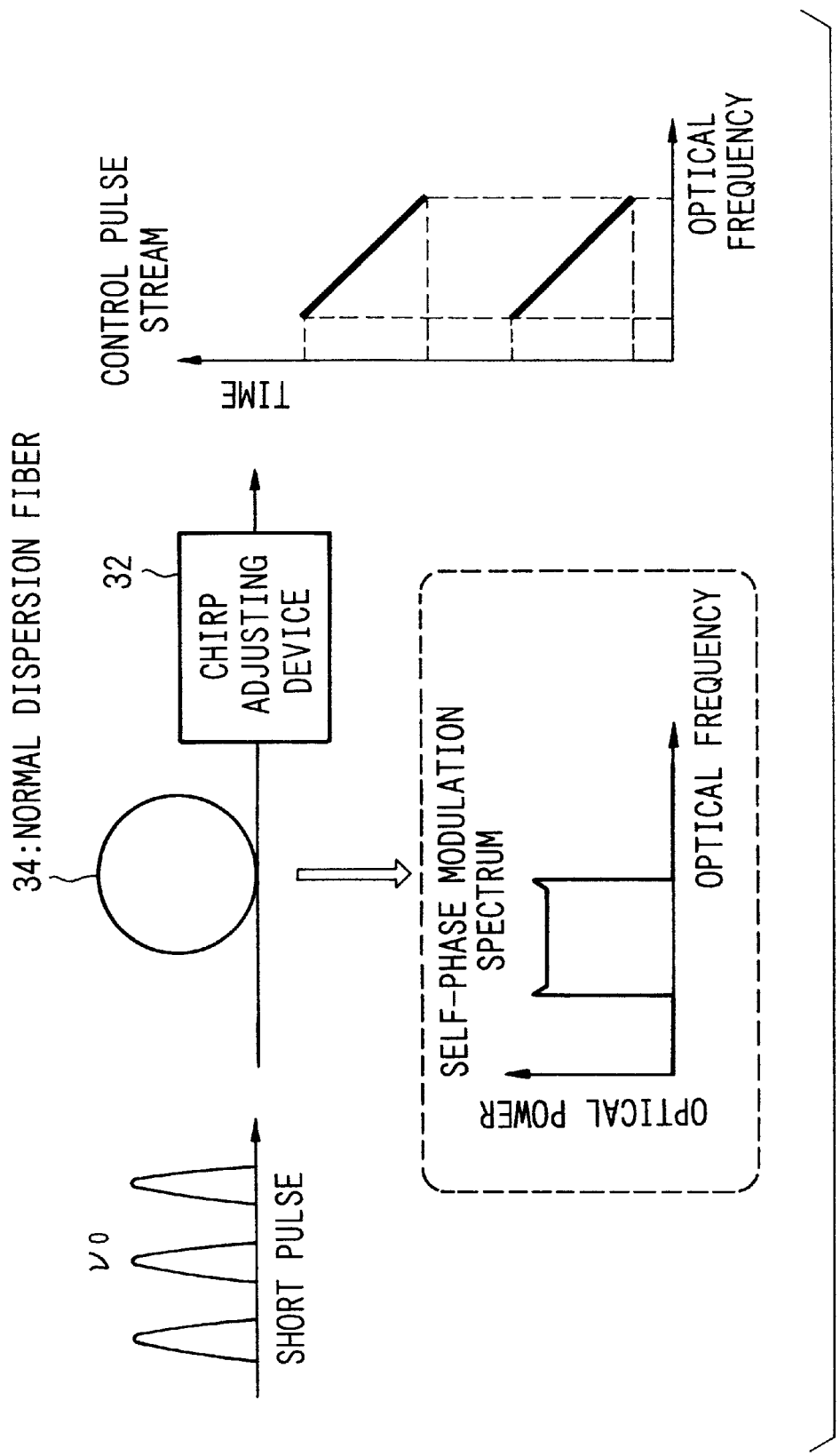
FIG. 10 is a second configuration of a control light source 13 to generate a stream of linearly-chirped control pulses.

FIG. 10 shows a second example of the linearly-chirped control light source 13.

The light source 13 comprises a normal dispersion fiber 34. Injection of short pulses (optical frequency $\upsilon_0$) into the normal dispersion fiber 34 generates linearly up-chirped control pulses over a wide time span due to a compounding effect of self-phase modulation and dispersion effects. To generate linearly down-chirped control pulses, a 1.3 $\mu$m zero-dispersion fiber as in the first example should be used.

Figure 22:
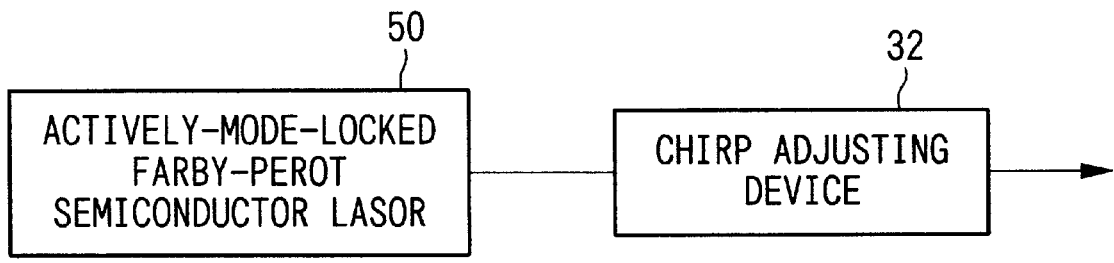
FIG. 22 is a third example of control light source 13 to generate a stream of linearly-chirped control pulses.

FIG. 22 shows a third example of the control light source. The light source 13 comprises an actively-mode-locked Farby-Perot semiconductor laser 50 fabricated by monolithic integration of electro-absorption modulators with connecting a chirp adjusting device 32. The laser 50 normally outputs light of 10 nm spectral width, and is able to produce optical pulses required by the present light source in conjunction with a chirp adjusting device 32. The advantage of this configuration is that the use of a semiconductor laser source enables to produce a compact light source. To generate linearly down-chirped control pulses, use a 1.3 $\mu$m zero-dispersion fiber as a chirp adjusting device 32 same as in the above first and second examples.

Figure 23:
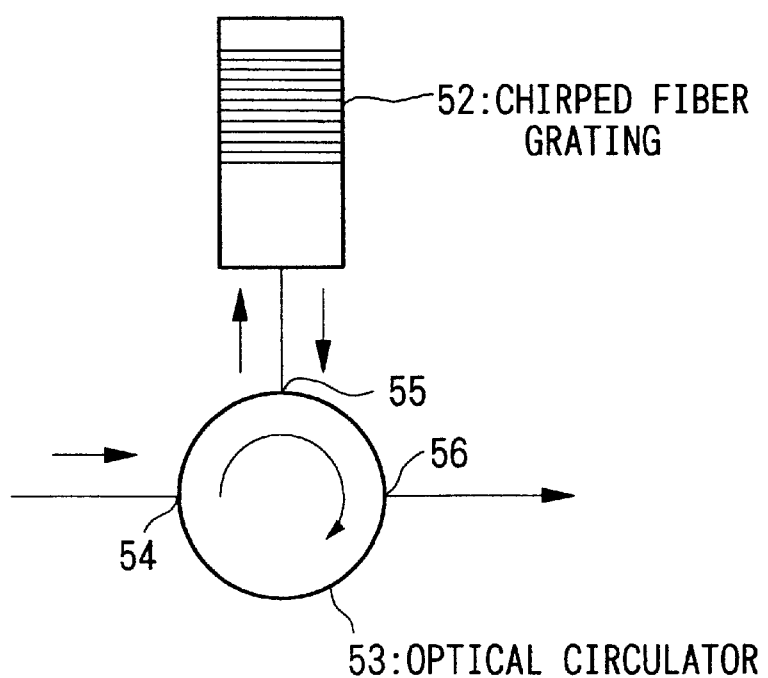
FIG. 23 is a schematic diagram of an example of the chirp adjustment device.

Another example of the configuration for chirp adjusting device 32 is shown in FIG. 23. The light source comprises an optical circulator 53 and a chirped fiber grating 52. Fiber grating is an optical device based on an optically-induced refractive index change, so that a phenomenon of increased refractive index is observed when ultraviolet light is radiated on a GeO$_2$-doped SiO$_2$ fiber. Based on this phenomenon, it is possible to periodically alter the refractive index of the core section of an optical fiber and to selectively reflect corresponding Bragg reflection wavelengths.

Chirped fiber grating is a fiber whose grating period is gradually changed along the longitudinal direction of the fiber, thereby producing a fiber with wavelength-dependent reflection, i.e., it acts as a dispersive medium. In FIG. 23, a control light is input into port 54 of the optical circulator 53 and is output from port 55 and is input into the chirped fiber grating 52. Because of the wavelength-dependency of the reflection positions in the chirped fiber grating 52, the control pulses are chirped and are output from the grating 52, and again input into port 55 of optical circulator 53 and are output from port 56.

Optical Kerr medium 14 having a positive non-linear refractive index may be chosen from: SiO$_2$ fibers; chalcogenide glasses made mainly of such material as chalcogenides of As, S; and semiconductor amplifiers. Also, optical Kerr medium 14 having a negative nonlinear-index coefficient may be chosen from: $\pi$-conjugate group organic materials; III-V group and II-VI group compound semiconductors.

It should be noted that, when using optical fibers for demultiplexing purposes, group velocity dispersion characteristics of the fiber introduce differences in group delay, a so-called "walk-off" phenomenon, between signal pulses and control pulses of different wavelengths. This phenomenon is a cause for cross-talk between the channels. To avoid this problem, select a bandwidth in the vicinity of a zero-dispersion wavelength where group delay characteristics can be approximated by a second order curve, and operate the optical system so that the center wavelengths of the signal pulse and the control pulse are symmetrical across the zero-dispersion wavelength, thereby making the walk-off value to be zero.

FIGS. 11A~11D show the results of numeral simulation studies of the all-optical time-division multiplexed demultiplexing circuit. A dispersion-shifted optical fiber of 1 km length and zero-dispersion wavelength at 1547 nm was supposed for an optical Kerr medium. The center wavelengths of the signal pulse and control pulse were, respectively, 1555 nm, and 1539 nm so as to be symmetrical about the zero-dispersion wavelength. Waveform of the signal pulse was a Gaussian type having a pulse width of 4 ps, and a peak power of 200 mW, control pulse was also a down-chirped Gaussian type having a pulse width of 50 ps, and a spectral half-width of 12 nm.

Figure 11A:
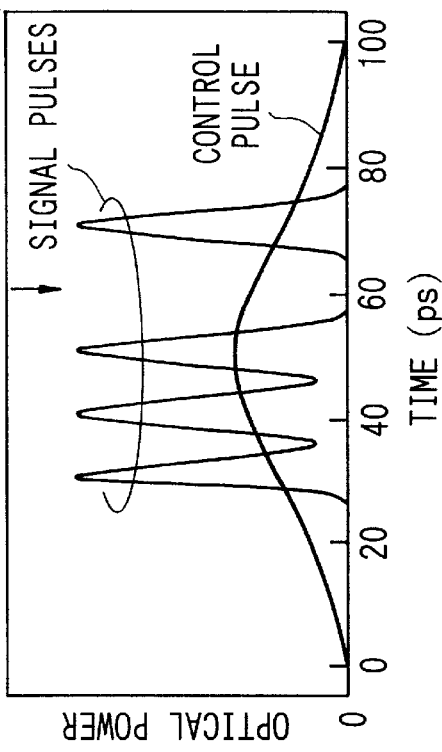
FIGS. 11A~11D are numerical simulation results of the all-optical time-division demutiplexing circuit of the present invention.
Figure 11B:
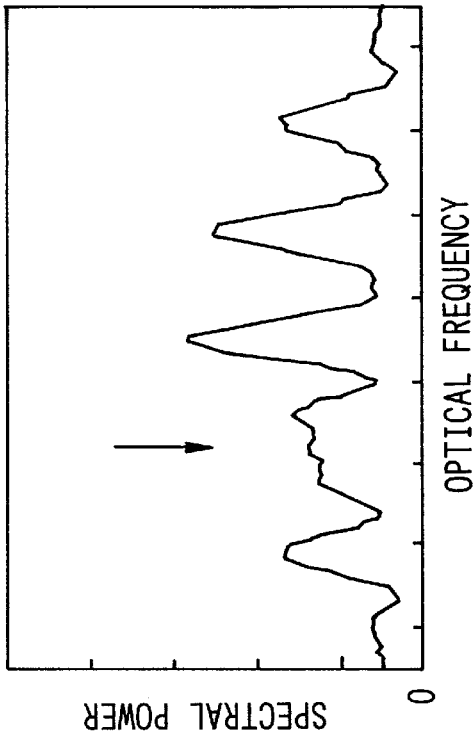

FIG. 11A shows waveforms of a control pulse and a stream of time-division multiplexed signal pulses represented by a "11111" pattern on the time base. FIG. 11B shows spectral power of the control pulse after propagating through the optical Kerr medium. Five peaks are observed corresponding to the signal pulse pattern. The arrow in the FIG. 11A indicates a signal pulse and an arrow in FIG. 11B indicates a corresponding spectral component of the intensity-modulated control pulse.

Figure 11C:
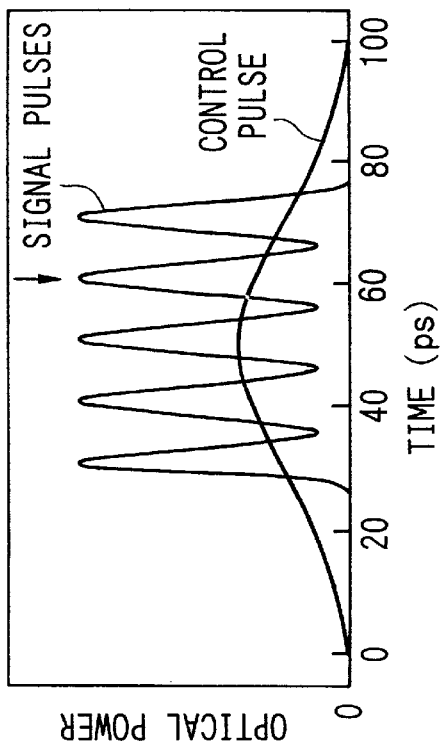
Figure 11D:
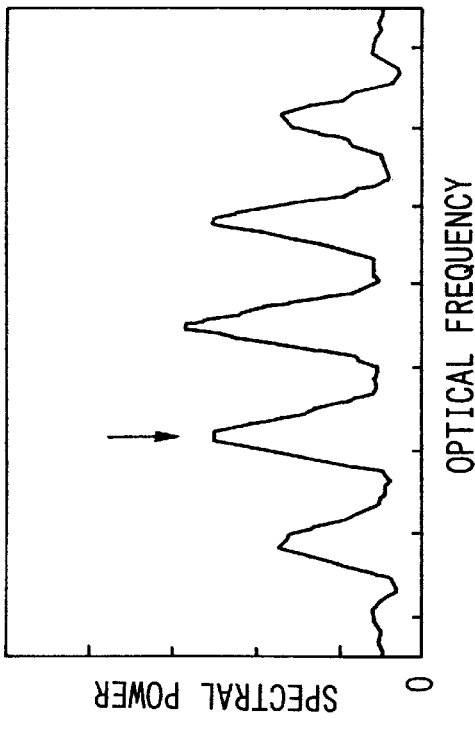

FIG. 11C shows waveforms of a control pulse and a stream time-division multiplexed signal pulses represented by a "11101" pattern on the time base. FIG. 11D shows spectral power of the control pulse after propagating through the optical Kerr medium. Four peaks are observed corresponding to the signal pulse pattern. The arrow in FIG. 11C indicates a signal pulse and the arrow in FIG. 11D indicates a corresponding spectral component of the intensity-modulated control pulse.

Figure 12:
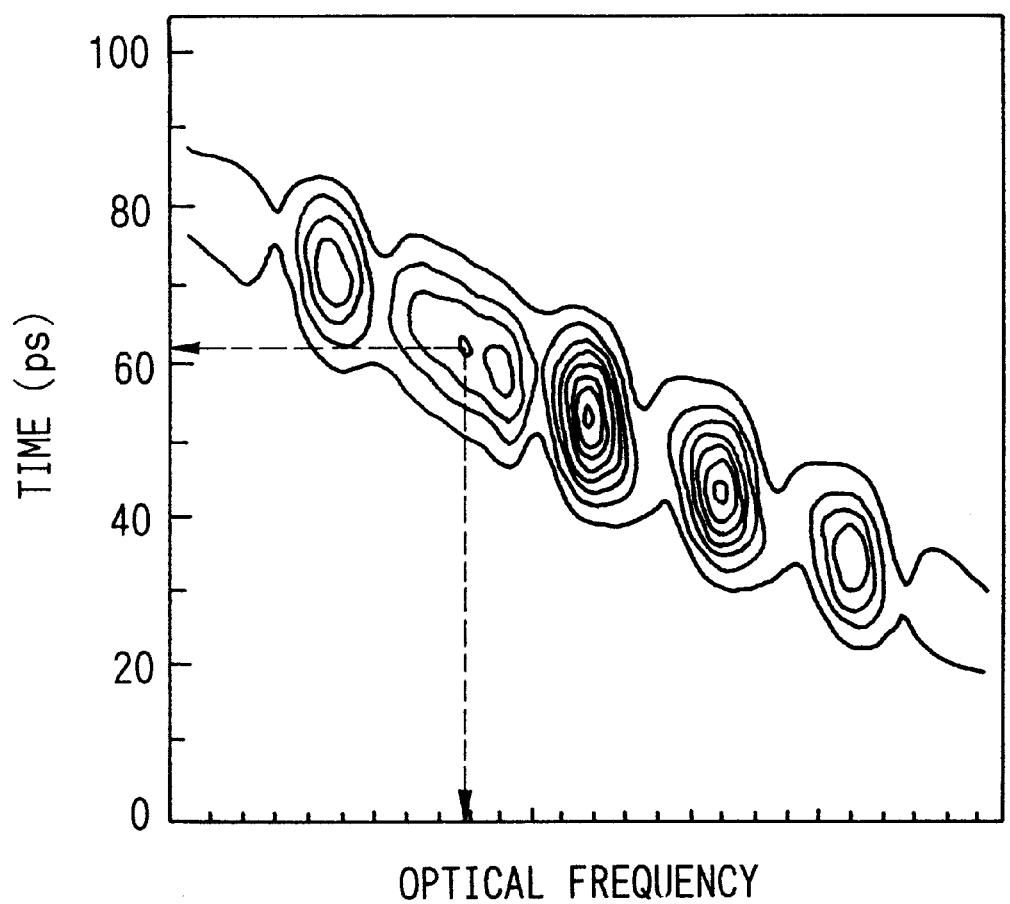
FIG. 12 is a contour diagram produced by numerical simulation of the all-optical time-division demultiplexing circuit of the present invention.

FIG. 12 shows a constant-power contour graph of time-resolved decomposition spectra of a control pulse when time-division multiplexed pulse stream has "11101" pattern, after propagating through the optical Kerr medium. In FIG. 12, time and optical frequency indicated by the arrows relate, respectively, to time and frequency shown in FIGS. 11C and 11D. These simulation results demonstrate clearly that the presence or absence of signal pulses superimposed on the control pulse on the same time base affects the intensity-modulation of the spectral components of the control pulse.

Embodiment 2 of Time-Division Demultiplexing Circuits

The amount of frequency shift caused by cross-phase modulation, as a non-linear optical effect, utilized in the present invention is dependent on the relative polarization states of the signal light and control light. Therefore, the demonstrated action in the present invention (the intensity-dependent modulation effect of the linearly chirped control pulse) is also dependent on the polarization states of the input signal light. It is also known that polarization states of signal light propagated through an optical fiber waveguide generally change randomly. Therefore, Embodiment 2 relates to polarization-independent circuit configurations which are not affected by random changes in the polarization states of signal light.

Figure 27:
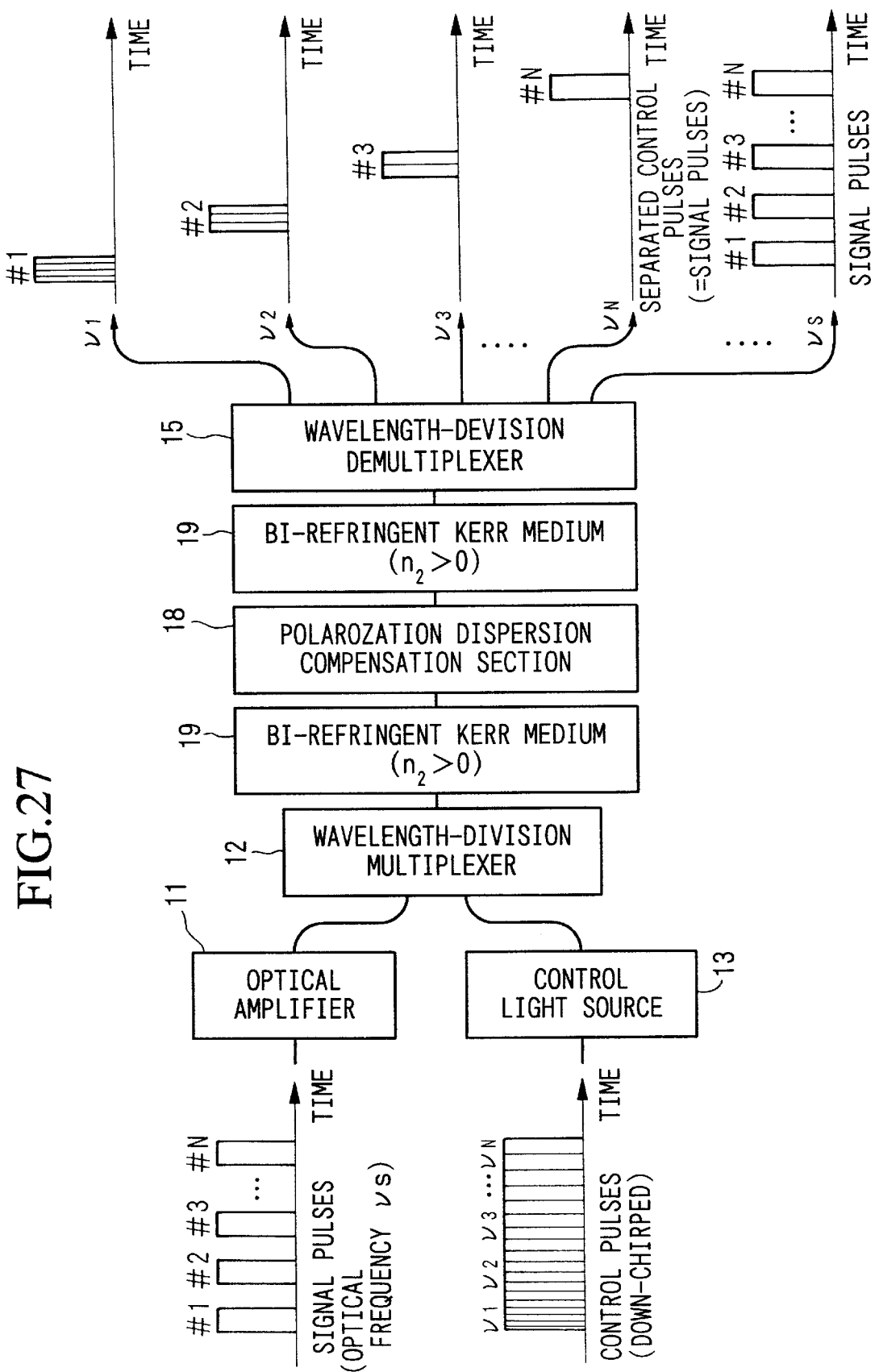
FIG. 27 is a schematic diagram of a second embodiment of the all-optical time-division demultiplexing circuit of the present invention.

FIG. 27 shows an example of such a circuit. The structures which are the same as those in FIG. 1 will not be explained again. In this embodiment, an output light from the wavelength-division multiplexer 12 propagates through a polarization mode dispersion compensation section 18 disposed between two bi-refringent Kerr media 19 (shortened to bi-Kerr medium).

Input signal light launched into a bi-Kerr medium 19 separates into two linearly polarized-wave signals along with orthogonal principal axes of the bi-Kerr medium, and propagates through the medium 19 while maintaining the polarization state. The power distribution ratio of input signal light to the two principal axial components is governed by the polarization states of the signal light at the input time. In the meantime, control light is input into bi-Kerr medium 19 so that the power distribution ratio to the two principal axial components will be 1:1. This can be achieved by inputting linearly polarized control light into the bi-Kerr medium 19 so that the linearly polarized control light is tilted at 45 degrees with respect to one of the principal axes of the bi-Kerr medium 19, for example.

While propagating through the bi-Kerr medium 19, control light receives chirp compensation independently for the two principal axial components due to cross-phase modulation effect with the signal light, and control spectral powers are increased. Spectral power increase factor caused by chirp compensation is proportional to the signal light power. Therefore, the spectral power increase factor due to chirp compensation in comparison to the sum of two axial control light components output from the bi-Kerr medium 19 does not depend on the power distribution ratio to the two principal axes of the signal light. In other words, spectral power of control light does not depend on the polarization states of input signal light at the time of injection into the bi-Kerr medium 19.

Figure 24:
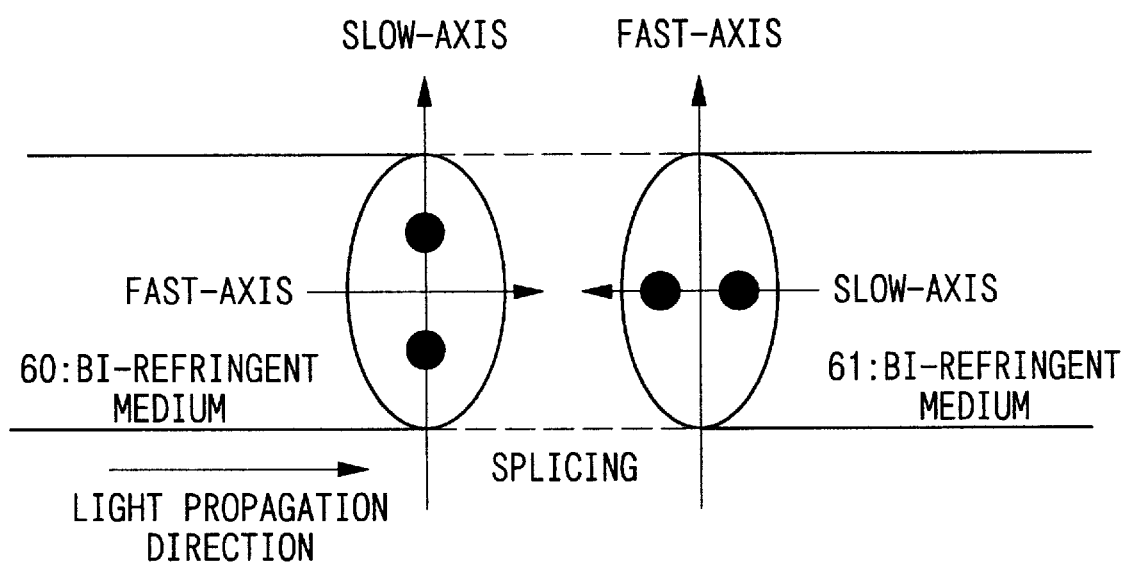
FIG. 24 is a schematic diagram of an example of the polarization mode dispersion compensation device.
Figure 25:
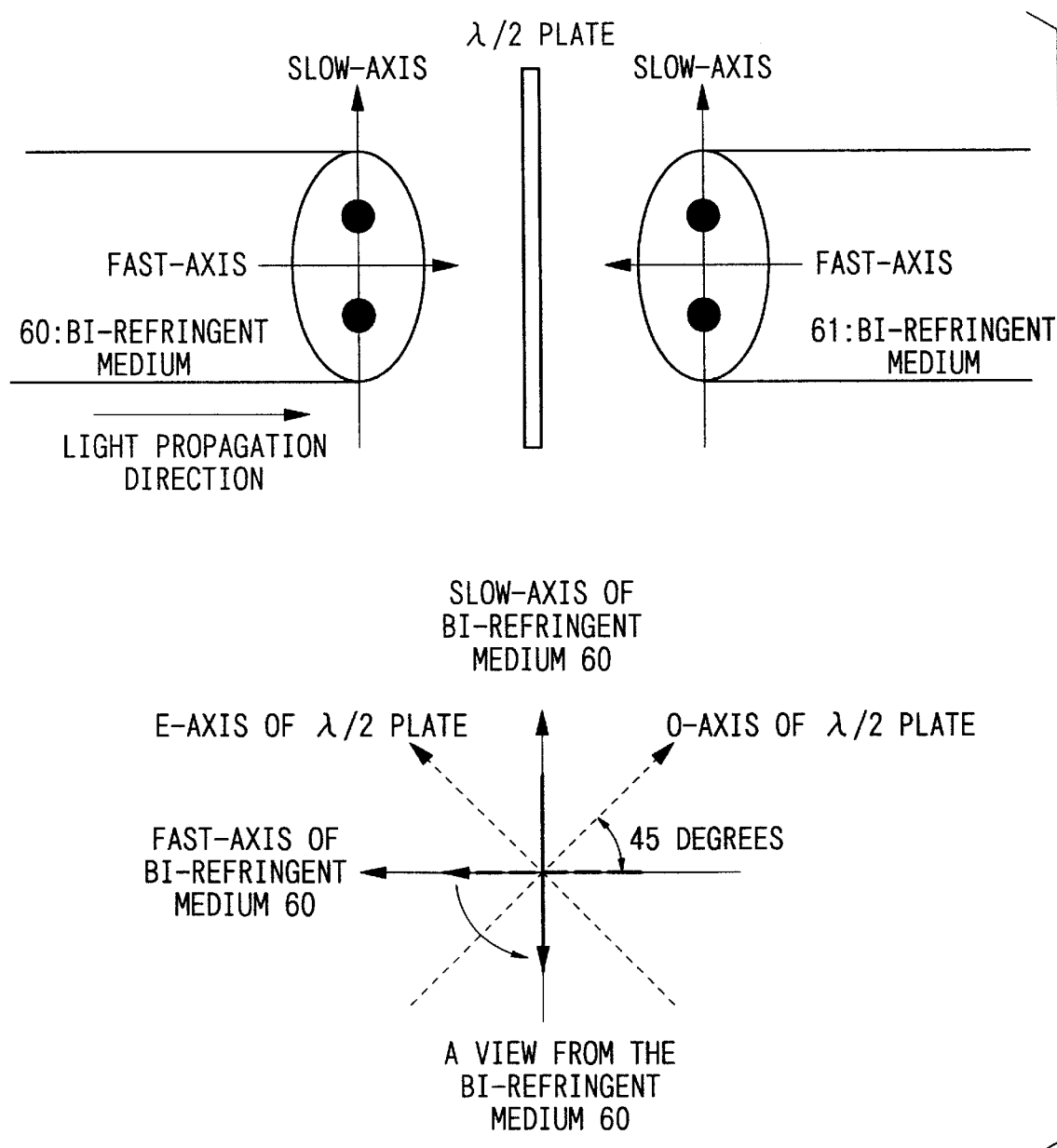
FIG. 25 is a schematic diagram of another example of the polarization mode dispersion compensation device.
Figure 26:
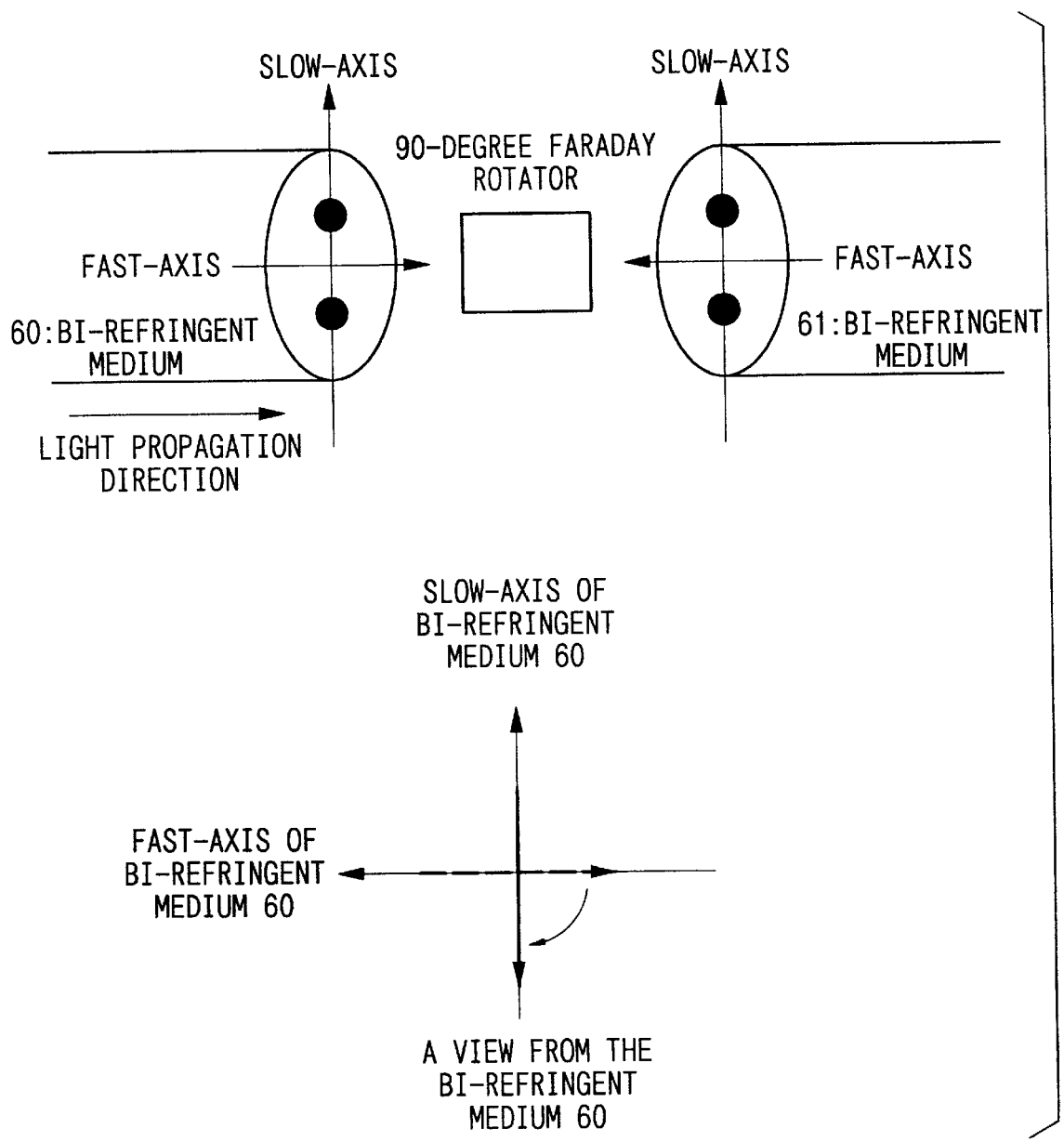
FIG. 26 is schematic diagram for yet another example of the polarization mode dispersion compensation device.

Also, because there is an intervening polarization mode dispersion compensation section 18 in the mid-point of the optical path to switch the fast-axis and the slow-axis of the bi-Kerr medium 19, the optical path lengths for the two axes become identical, and any time-lag of the two polarization component can be compensated. Examples of polarization mode dispersion compensation section 18 are shown in FIGS. 24–26 in conjunction with discussions presented above. Therefore, it is possible to realize a polarization independent operation that does not depend on polarization states of input signal light, without degrading the operational bandwidth of the circuit.

It should be noted that polarization states of control light at the input time into the bi-Kerr medium 19 may assume other states such as circular polarization, or elliptical polarization whose major or minor axis is tilted with respect to the principal axis of the bi-Kerr medium 19 at 45 degrees.

Also, when propagation loss and nonlinear-index coefficient are different in the two principal axes in the bi-Kerr medium 19, polarization-state-independence can be achieved by adjusting the power distribution ratio to the two principal axial components of control light in the bi-Kerr media 19.

Also, if the operational properties of the two bi-Kerr media 19 are different, because of deviations in manufacturing conditions and other reasons, polarization mode dispersion may also be different. In such cases, it is not necessary that the optical path lengths are equal in the two media 19, so, the lengths can be altered so that the overall polarization mode dispersion can be compensated by the polarization mode dispersion compensation section 18. Therefore, the number of bi-Kerr medium 19 of different path lengths and polarization mode dispersion compensation section 18 are not particularly restricted when the overall dispersion is compensated. However, because of insertion loss and simplicity of the circuit, the configuration shown in this embodiment is preferable.

A circuit configuration based on another concept to avoid polarization-dependent frequency shift of control light will be explained below. Instead of using bi-Kerr medium used in the above example, an isotropic Kerr medium will be used. In this case, polarization mode dispersion compensation section 18 will not be necessary. The efficiency of cross-phase modulation effect in such a circuit becomes dependent on the polarization states of the control light and signal light, and even under the worst condition of dependency on the polarization states, i.e., orthogonal linearly polarized light, it is about ⅓ of the best efficiency. In other words, the efficiency will never drop to zero. Thus, if the worst-case design allows some sensitivity degradation, receiver sensitivity for separated signals can be made independent of the polarization states of the input signals.

Embodiment 3 of Time-Division Demultiplexing Circuits

Figure 6A:
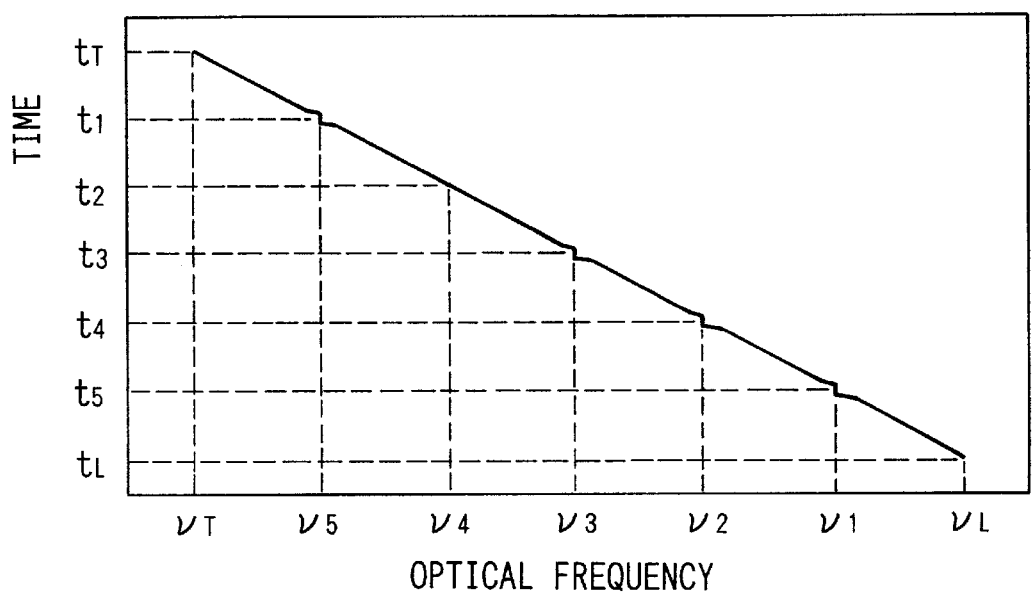
FIGS. 6A and 6B are time-resolved spectra of the control pulse and a spectral power distribution graph.
Figure 6B:
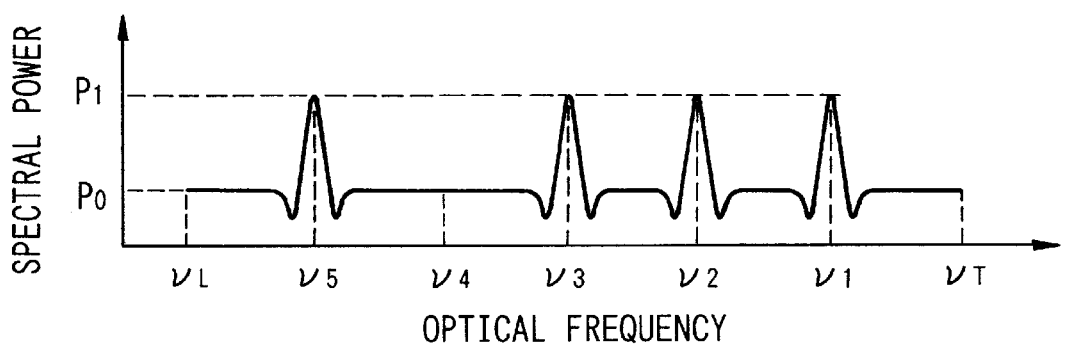

The all-optical time-division demultiplexing circuits in the present invention utilize the frequency shift of control pulse by cross-phase modulation effect with the signal pulses, as shown in FIGS. 4 or 6, therefore, the on/off extinction ratio of intensity modulation is about several dB. In general, the on/off extinction ratio of external modulator is about 25 dB, for a Mach-Zender interferometer type based on electrooptic effects of $LiNbO_3$ devices, so that the circuits in the foregoing embodiments, discrimination margin or phase margins for discriminating individual signal pulses is low. Therefore, Embodiment 3 presents an example circuit which improves on/off extinction ratios of individually separated optical signal pulses.

Figure 13:
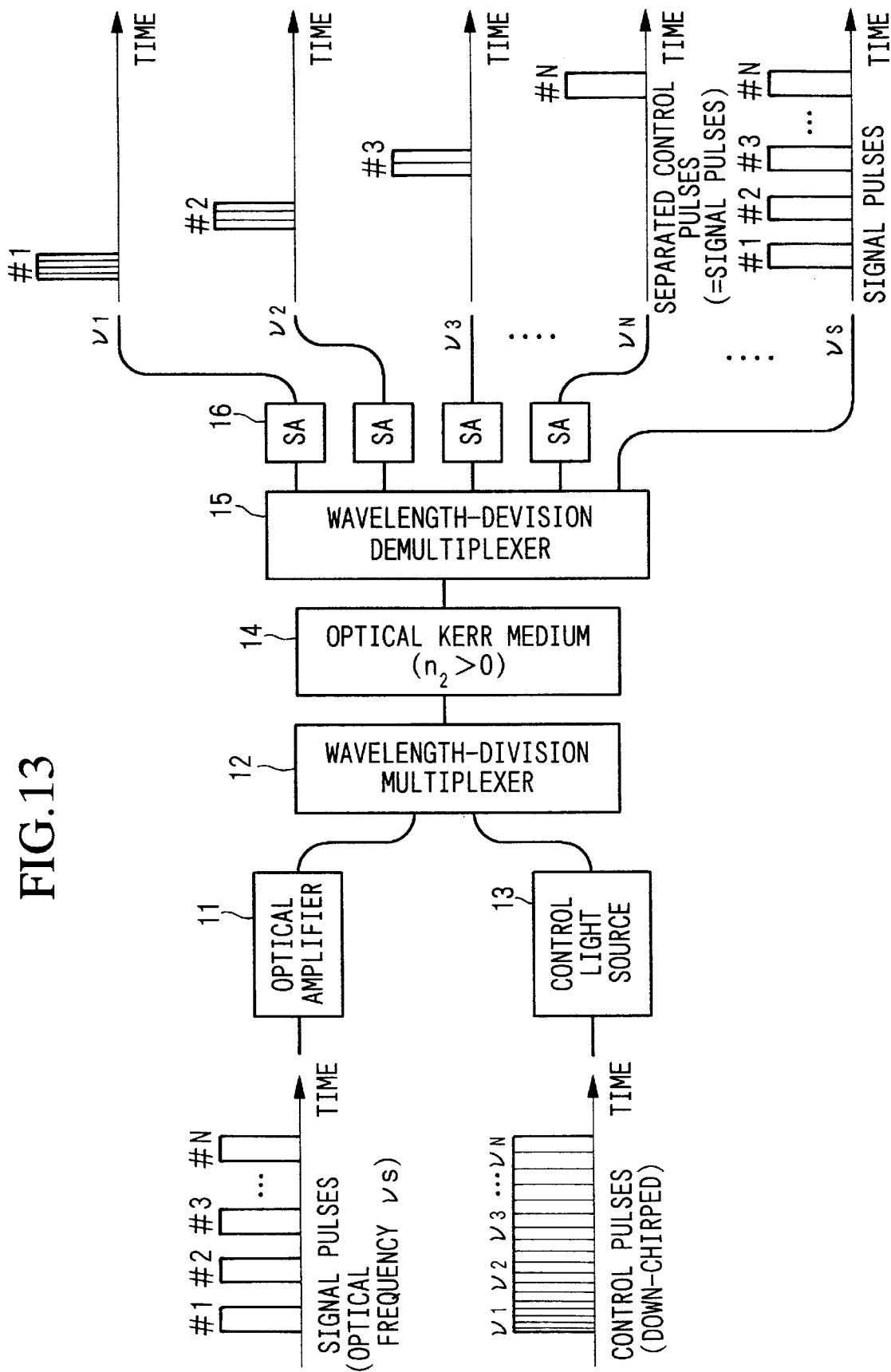
FIG. 13 is a schematic diagram of a second embodiment of the all-optical time-division demultiplexing circuit.

FIG. 13 shows a circuit configuration of Embodiment 3.

The feature of this circuit is that an extinction ratio improving section (SA) 16 based on means such as a saturable absorber for improving the on/off extinction ratio is connected to each output port of the wavelength demultiplexer 15 in Embodiment 1 circuit shown in FIG. 1. SA section 16 is based on a saturable absorber media such as non-linear optical loop mirror, semiconductor materials such as bulk GaAs or those having a quantum well structure, non-linear etalon comprised of optical glass containing fine semiconductor particles such as $CdSxSe_{1-x}$ surrounded by partially transparent mirrors, optical bistable devices based on Stark effect of exciton in multiple-quantum-wells, bistable semiconductor lasers and non-linear directional couplers.

Embodiment 4 of Time-Division Demultiplexing Circuits

Time-division multiplexed demultiplexing circuits of the present invention are based on TDM to WDM signal conversion utilizing chirp compensation of control light. This is because, although on-power level of converted WDM signals is increased due to amplification gain from chirp compensation, off-level power is not affected by the non-linear mutual interaction effect by the signal light and does not generate chirp compensation, and remains at the original power level of the control light. Therefore, the on/off ratio of time-division multiplexed signals obtained by demultiplexing WDM signals is low.

Figure 28:
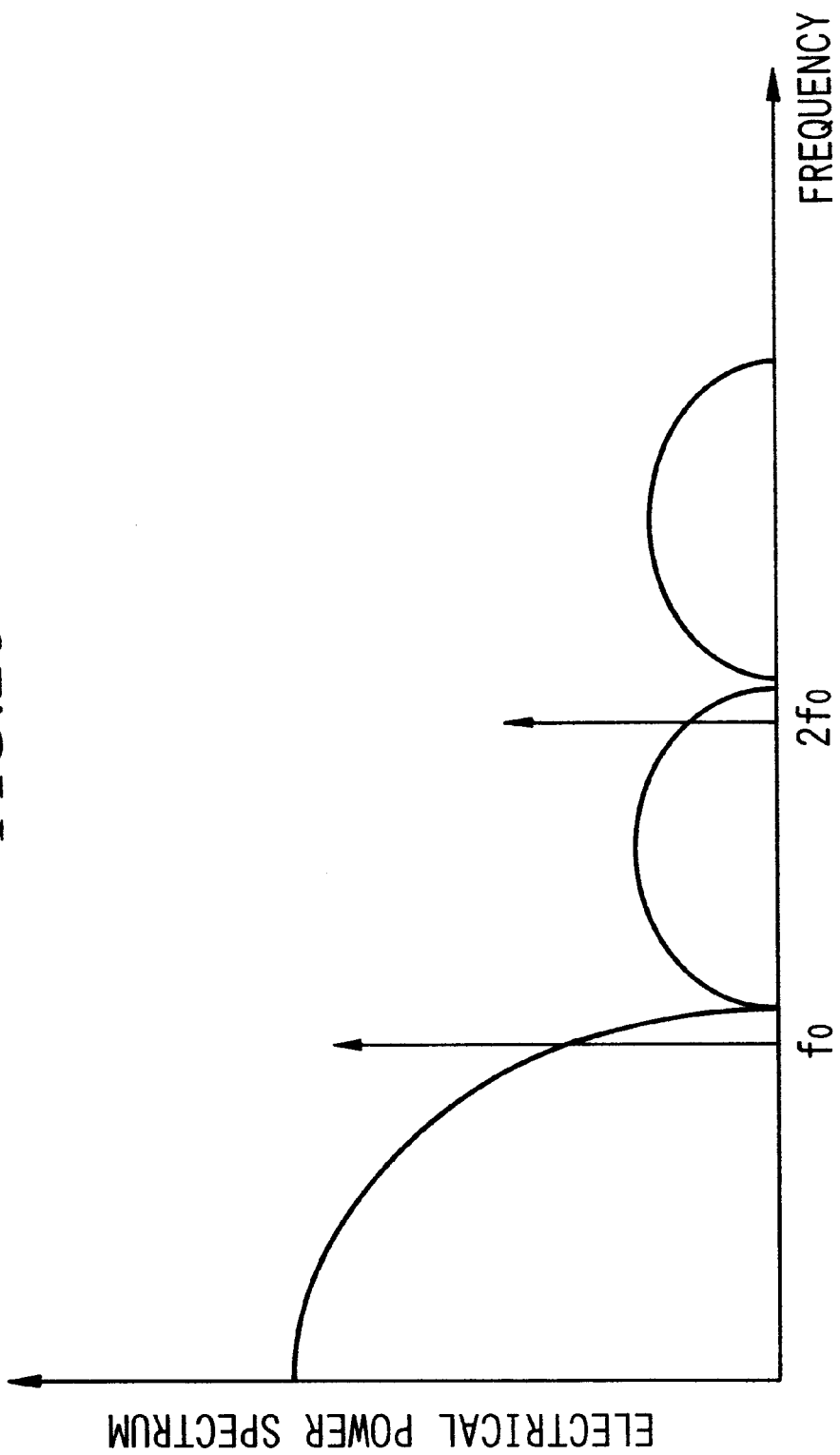
FIG. 28 is an electrical power spectrum of time-division demultiplexed signal after optical-to-electrical (O/E) conversion.

However, referring to the power spectrum of time-division multiplexed signals obtained by optical-to-electrical (O/E) conversion in FIG. 28, most of the off-component power is concentrated in line spectral component of the repetition frequency of time-division multiplexed signals, shown by $f_0$ in FIG. 28. Therefore, by inserting a low-pass filter or band-rejection filter to suppress the repetition frequency, it is possible to improve the on/off ratio of electrical power of time-division multiplexed signals.

Figure 14:
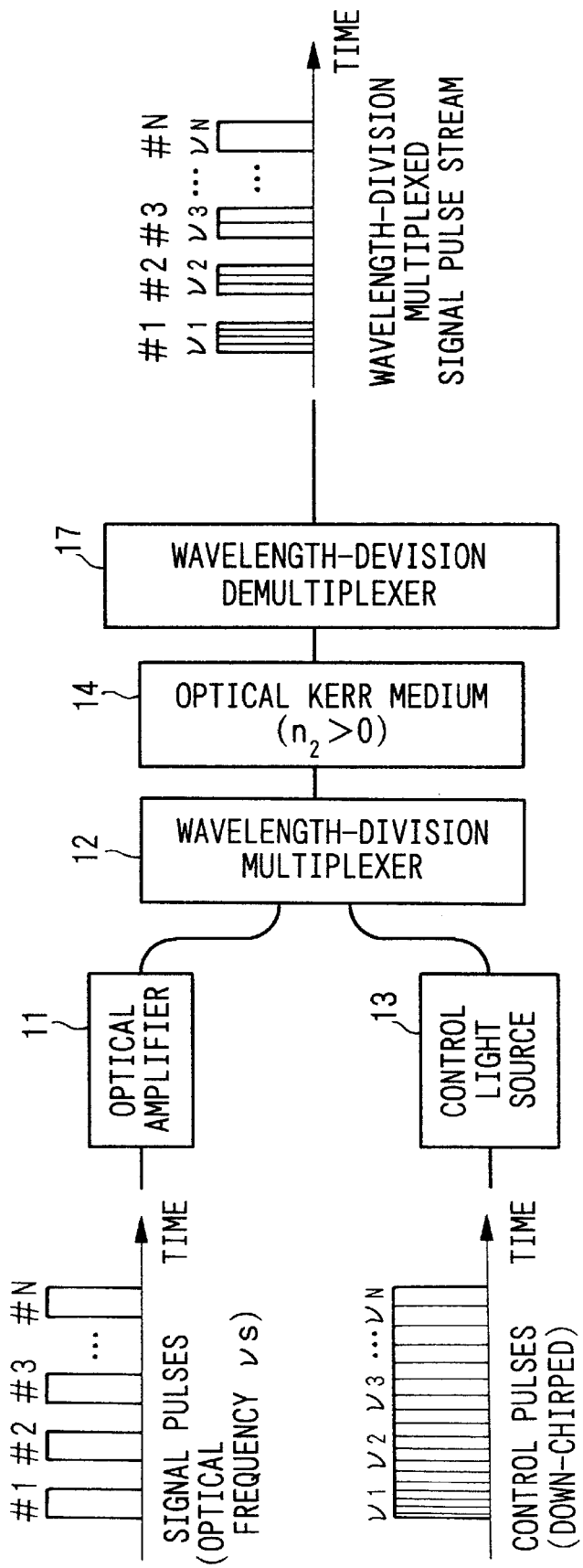
FIG. 14 is a first embodiment of an all-optical TDM-WDM conversion circuit of the present invention.

II. All-optical Time-Division Multiplexing to Wavelength-Division Multiplexing Conversion Circuits Embodiment 1 of TDM to WDM Conversion Circuits FIG. 14 shows Embodiment 1 of the TDM-WDM conversion circuit.

The feature of the circuit is that the wavelength-division demultiplexer 15 in FIG. 1 is replaced with a wavelength-division demultiplexer 17. The wavelength-division demultiplexer 15 demultiplexes optical frequencies in the vicinities of $v_1, v_2, v_3, \ldots, v_N$ from the control pulse propagated through the optical Kerr medium 14 and outputs them separately to each output port. In contrast, wavelength-division demultiplexer 17 multiplexes demultiplexed control pulses and outputs multiplexed control pulses to one output port. Control pulses output from the wavelength-division demultiplexer 17 are wavelength-division multiplexed signal pulse streams where each signal channel of optical frequency $vs$ in time-division multiplexed signal pulse streams is replaced with optical frequencies $v_1, v_2, v_3, \ldots, v_N$ in wavelength-division multiplexed signal pulse streams.

Figure 15A:
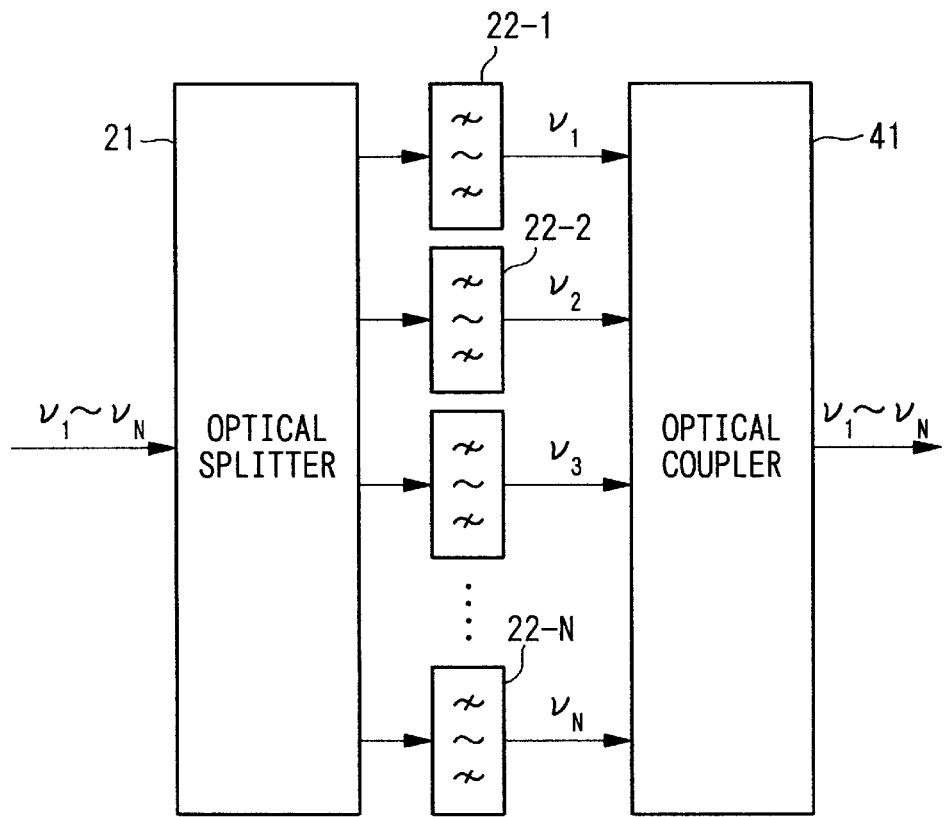
FIGS. 15A and 15B are schematic diagrams of a first configuration of a wavelength demultiplexer 17.
Figure 15B:
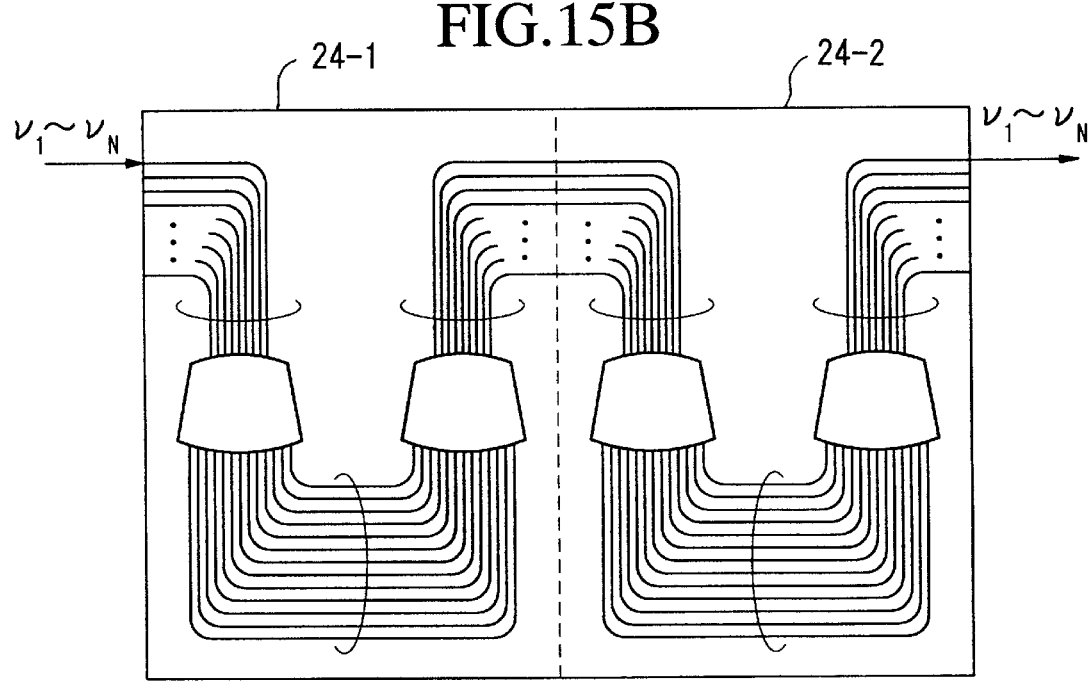

FIGS. 15A and 15B show first examples of the configuration of the wavelength multiplexer 17.

The wavelength-division demultiplexer 17 shown in FIG. 15A is comprised of, optical splitter 21 which splits one input into N output, an optical bandpass filter 22-1~22-N with transmission frequencies $v_1, v_2, \ldots, v_N$, and an optical coupler 41 for multiplexing output light from the bandpass filters.

The wavelength-division demultiplexer shown in FIG. 15B is comprised of connected two arrayed waveguide grating 24, shown in FIG. 8C, in series. In other words, control pulse is wavelength-division demultiplexed in the grating 24-1 into optical frequencies $v_1, v_2, \ldots, v_N$ and they are multiplexed in the grating 24-2 and are output from one output port.

Figure 16:
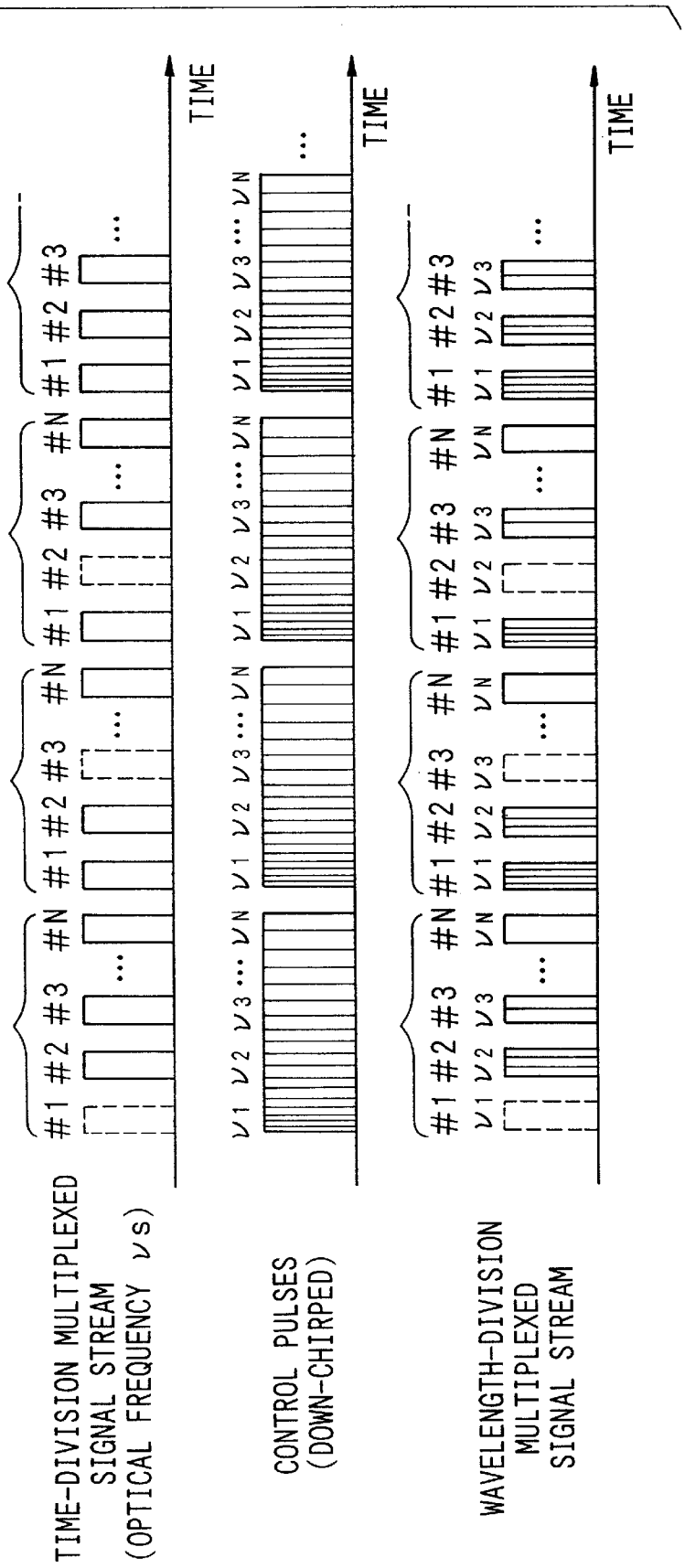
FIG. 16 is an illustration of the positional relation on the time base of control pulses to a stream of time-division mutiplexed signal pulses in the TDM-WDM conversion circuit of the present invention.

FIG. 16 shows positional relation of a time-division multiplexed pulse stream and control pulses on the same time base in the TDM-WDM conversion circuit. Here, the time-division multiplexed pulse stream (of optical frequency $vs$) is designated as "011 . . . 1", "110 . . . 1", and "101 . . . 1". Individual signal channels of the time-division multiplexed signal are converted into optical frequencies $v_1, v_2, \ldots, v_N$, and are output as a stream of wavelength-division multiplexed pulses.

Embodiment 2 of TDM to WDM Conversion Circuits

FIG. 29 shows a second circuit configuration. The feature of the circuit is that the wavelength-division demultiplexer 15 in FIG. 27 (Embodiment 2 of time-division multiplexed circuit) is replaced with a wavelength-division demultiplexer 17. The wavelength-division demultiplexer 15 demultiplexes optical frequencies in the vicinities of $v_1, v_2, v_3, \ldots, v_N$ from control pulse propagated through the optical bi-Kerr medium 19 and outputs them separately to each output port. In contrast, wavelength-division demultiplexer 17 multiplexes demultiplexed control pulses and outputs multiplexed control pulses to one output port. Polarization mode dispersion compensation devices are the same as those indicated in FIGS. 24~26. Based on this configuration, it is possible to realize a TDM-WDM conversion circuit which is not affected by the polarization states of input signals.

Embodiment 3 of TDM to WDM Conversion Circuits

Embodiment 3 relates to another circuit configuration of TDM-WDM conversion to provide improved on/off extinction ratio of signal channels of wavelength-division multiplexed signal pulses. The overall configuration is the same as the embodiment 1 shown in FIG. 14. The feature of this embodiment is in the structure of wavelength-division demultiplexer 17.

Figure 17A:
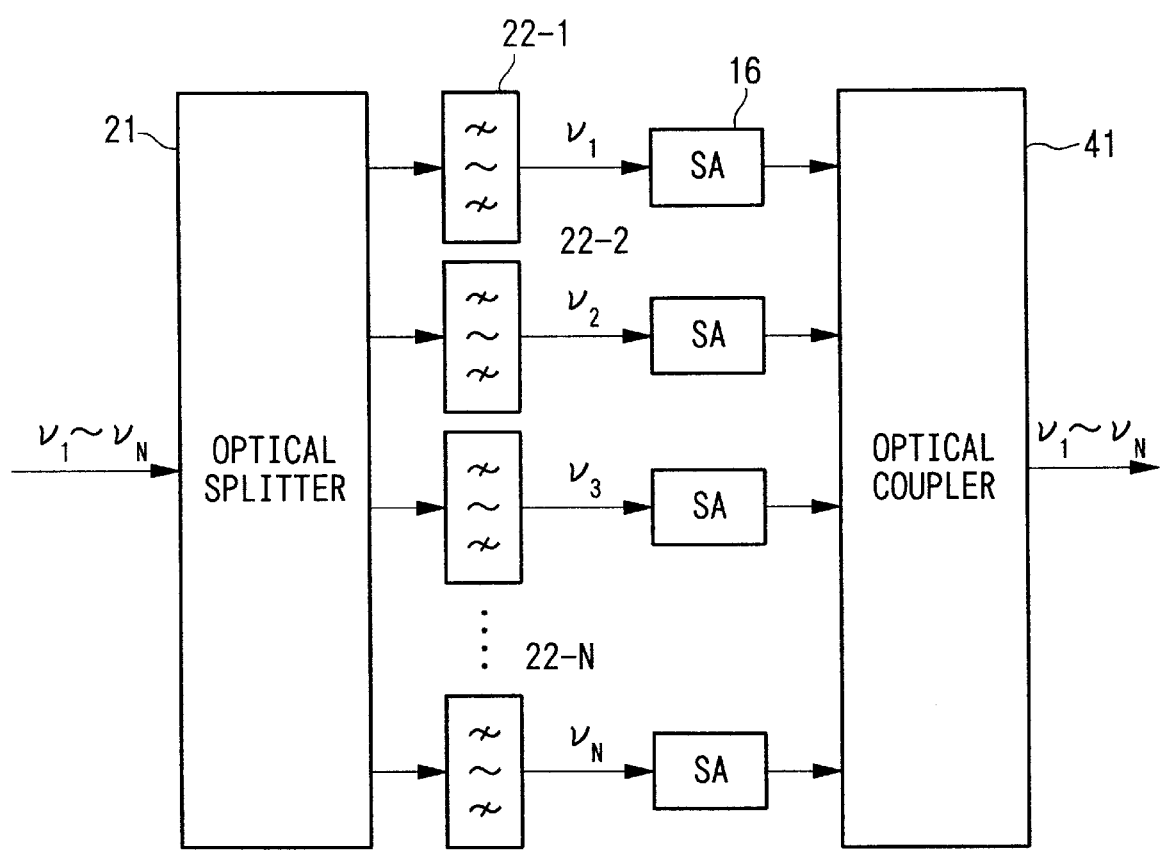
FIGS. 17A and 17B are schematic diagrams of a second configuration of a wavelength demultiplexer 17.

FIG. 17A shows a second configuration of the wavelength-division demultiplexer 17, which is provided with an extinction ratio improving section 16 based on such means as a saturable absorber (SA) for each of the output ports of the bandpass filters 22-1~22-N which were shown in FIG. 15A.

Figure 17B:
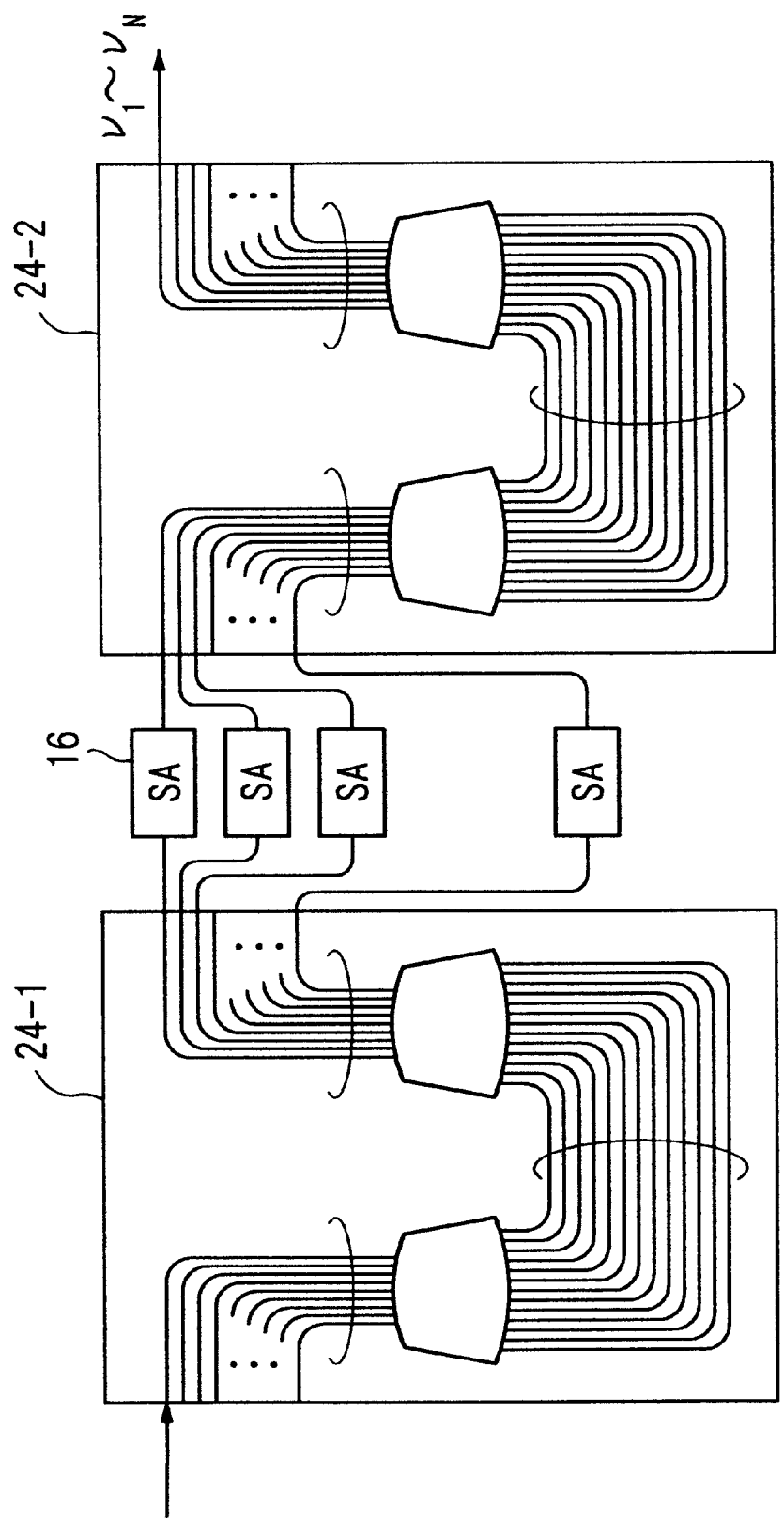
Figure 18:
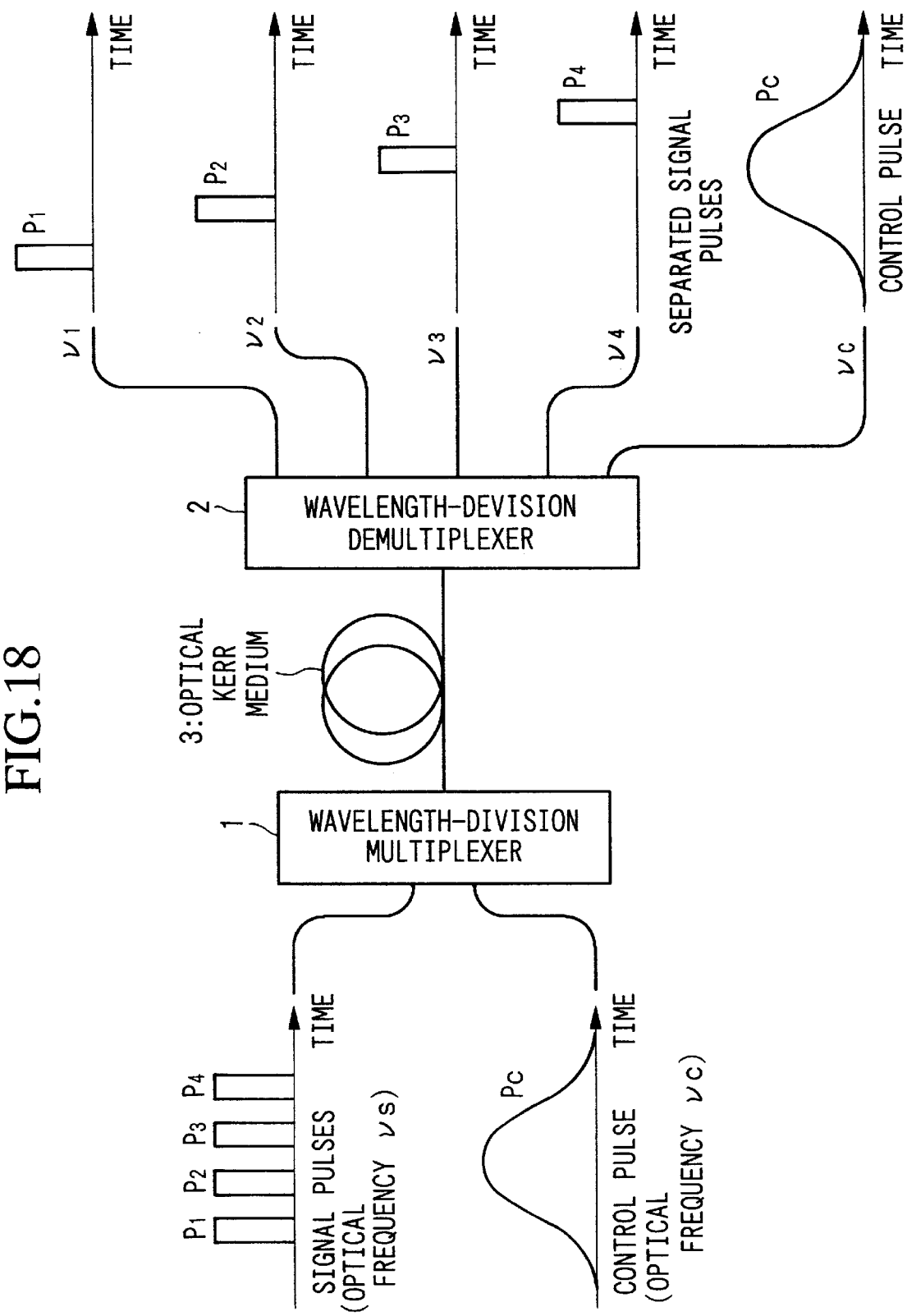
FIG. 18 is a schematic diagram of a first example of the conventional all-optical time-division demultiplexing circuit.
Figure 19:
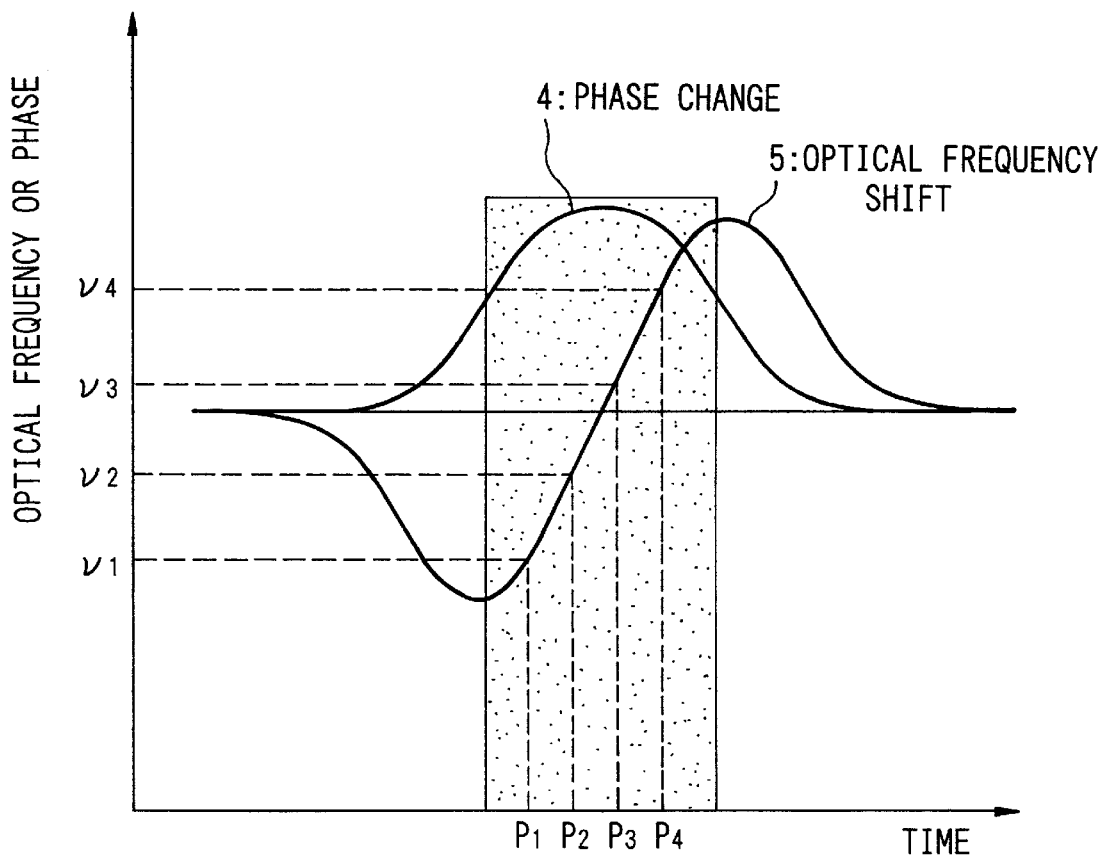
FIG. 19 is a schematic diagram to show the working of a first configuration of the conventional all-optical time-division demultiplexing circuit.
Figure 20:
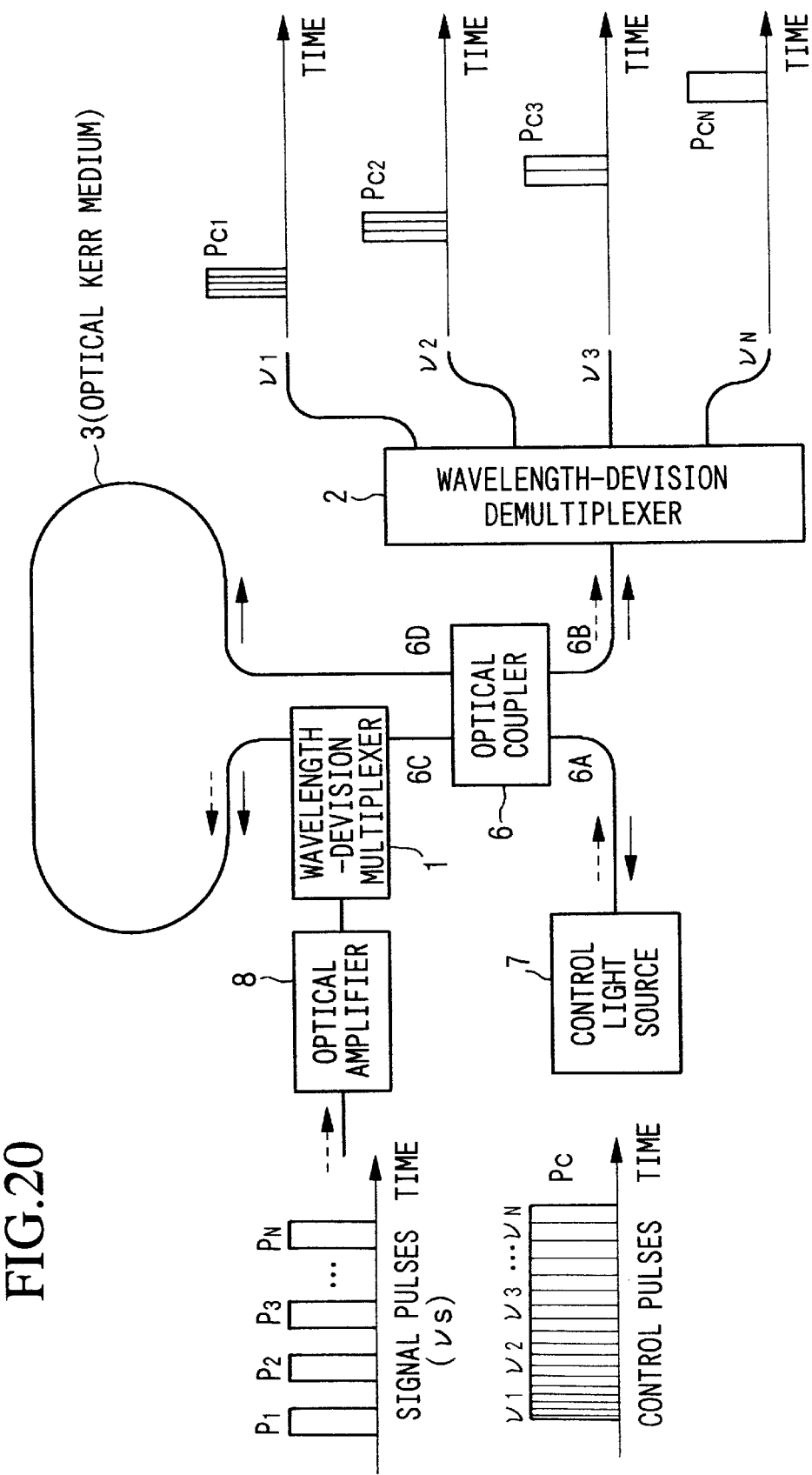
FIG. 20 is a schematic diagram of a second example of the conventional all-optical time-division demultiplexing circuit.
Figure 21:
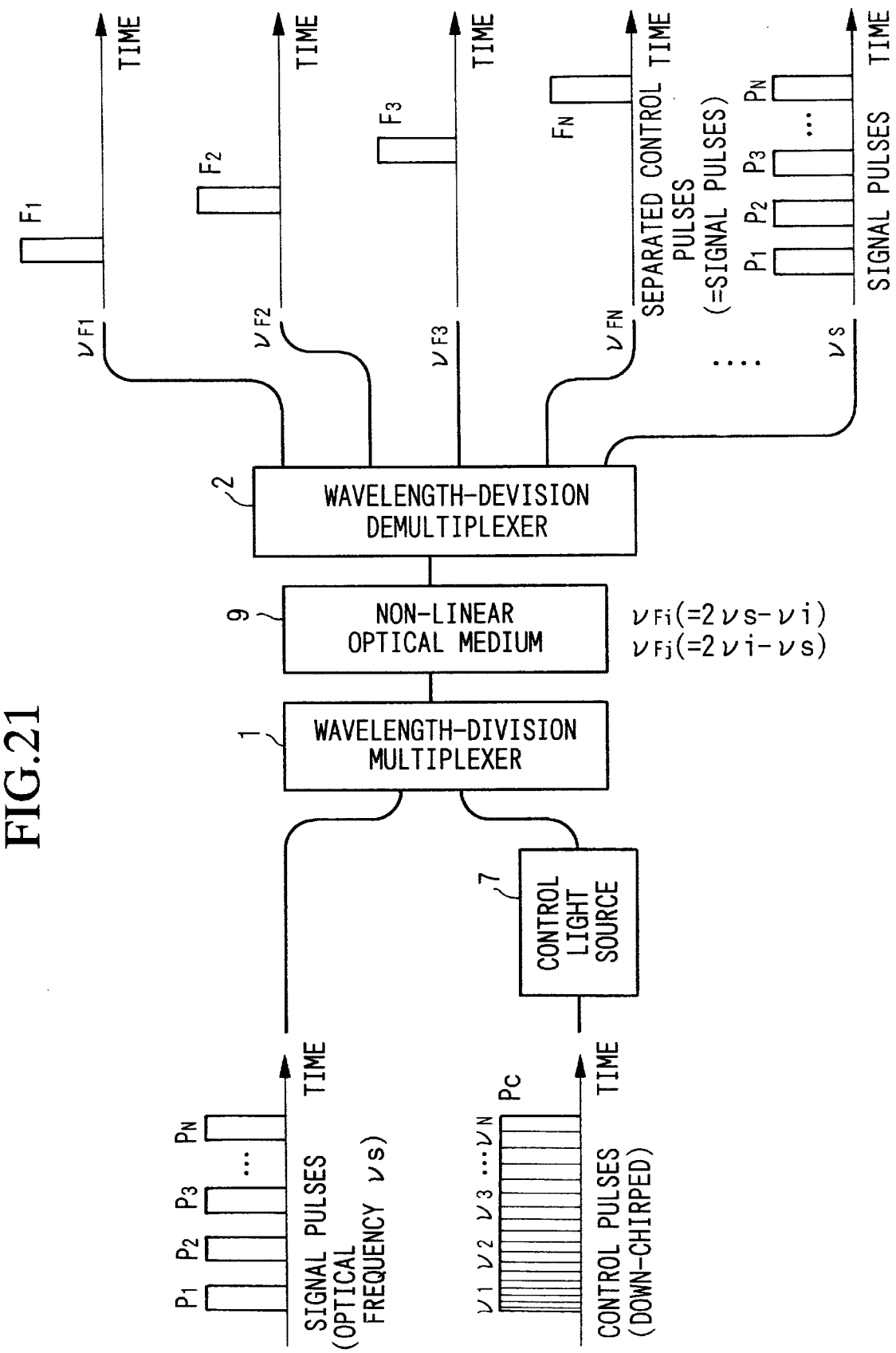
FIG. 21 is a schematic diagram of a third example of the conventional all-optical time-division demultiplexing circuit.

FIG. 17B shows a configuration having an extinction ratio improving section 16 based on such means as saturable absorber (SA) in each of the ports between an arrayed waveguide grating 24-1 and an arrayed waveguide grating 24-2 to improve the on/off extinction ratio.

What is claimed is:

1. An all-optical time-division demultiplexing circuit, for separating time-division multiplexed optical pulses, comprising:

optical power adjusting means for receiving an optical pulse stream of time-division multiplexed signal, of a signal frequency $vs$, comprised of N signal channels, where N is an integer greater than or equal to 2, and outputting power-adjusted signal pulses;

a control light source for generating control pulses which have the same repetition rate as said signal channels, and which are synchronized with signal channels of said time-division multiplexed optical pulses, and whose optical frequency varies monotonically from a leading end to a trailing end and is different from said signal optical frequency $vs$, and which have a pulse duration sufficient for a total inclusion of said N signal channels;

optical wavelength-division multiplexing means for multiplexing an optical pulse stream of time-division multiplexed signal power-adjusted by said optical power adjusting means and said control pulses;

an optical Kerr medium for receiving output signal by said optical wavelength-division multiplexing means, producing cross-phase modulation locally on the time axis to said control pulses depending on the presence or absence of signal pulses in said signal channel of said time-division multiplexed optical pulses, and power modulating said control pulse of component frequencies $v_1, v_2, \ldots, v_N$ corresponding to said each signal channel by inducing an optical frequency shift of said chirped control pulse to compensate on the frequency axis;

optical wavelength-division demultiplexing means for receiving light output by said optical Kerr medium, separating said control pulse of component frequencies $v_1, v_2, \ldots, v_N$ corresponding to signal channels of said time-division multiplexed optical pulse stream, and outputting to respective ports of corresponding individual optical frequencies.

2. An all-optical time-division demultiplexing circuit, for separating time-division multiplexed optical pulses according to claim 1, wherein said optical power adjusting means include an optical amplifier for providing a signal power amplification sufficient to enable said stream of time-division multiplexed signal pulses to induce, in optical Kerr media, cross-phase modulation on said control pulse.

3. An all-optical time-division demultiplexing circuit, for separating time-division multiplexed optical pulses according to claim 1, wherein said optical Kerr medium has a positive nonlinear-index coefficient, and said control pulse is a down-chirped pulse whose optical frequency decreases monotonically from a leading end to a trailing end of a control pulse waveform.

4. An all-optical time-division demultiplexing circuit, for separating time-division multiplexed optical pulses according to claim 1, wherein said optical Kerr medium has a negative nonlinear-index coefficient, and said control pulse is an up-chirped pulse whose optical frequency increases monotonically from a leading end to a trailing end of a pulse waveform.

5. An all-optical time-division demultiplexing circuit, for separating time-division multiplexed optical pulses according to claim 1, wherein said optical Kerr medium is a bi-refringent optical medium and includes a polarization mode dispersion compensation device to compensate polarization mode dispersion between two orthogonal principal axes, and a control light source produces control pulses whose polarization components in the two orthogonal directions have equal powers in said optical 2 bi-refringent Kerr medium.

6. An all-optical demultiplexing circuit, for separating time-division multiplexed optical pulses according to claim 5, wherein said polarization mode dispersion compensation device is comprised by connecting two bi-refringent Kerr media of an equal length in series so that a principal axis of each medium is at right angles to each other.

7. An all-optical demultiplexing circuit, for separating time-division multiplexed optical pulses according to claim 5, wherein said polarization mode dispersion compensation device is comprised by connecting two bi-refringent Kerr media of an equal length in series in such a way that a $\lambda/2$ plate is inserted between said two bi-refringent Kerr media.

8. An all-optical demultiplexing circuit, for separating time-division multiplexed optical pulses according to claim 5, wherein polarization mode dispersion compensation device is comprised by connecting two bi-refringent Kerr media of an equal length in series in such a way that a 90-degree Faraday rotator is inserted between said two bi-refringent Kerr media.

9. An all-optical conversion circuit for converting time-division multiplexed signal to wavelength-division multiplexed signal, comprising:

optical power adjusting means for receiving an optical pulse stream of time-division multiplexed signal pulses, of an optical frequency $\upsilon s$, comprised of N signal channels, where N is an integer greater than or equal to 2, and outputting power-adjusted time-division multiplexed signal pulses;

a control light source for generating control pulses which have the same repetition rate as said signal channels, and which are synchronized with signal channels of said time-division multiplexed optical pulses, and whose optical frequency varies monotonically from a leading end to a trailing end and is different from said signal optical frequency $\upsilon s$, and which have a pulse duration sufficient for a total inclusion of said N signal channels;

optical wavelength-division multiplexing means for multiplexing a control pulse with said power-adjusted time-division multiplexed signal pulses, and outputting a superimposed signal;

an optical Kerr medium for receiving output signal by said optical wavelength-division multiplexing means, producing cross-phase modulation locally on the time axis to said control pulses depending on the presence or absence of signal pulses in said signal channel of said time-division multiplexed optical pulses, and power modulating said control pulse of component frequencies $\upsilon_1, \upsilon_2, \ldots, \upsilon_N$ corresponding to said each signal channels by inducing an frequency shift of said chirped control pulse to compensate on the frequency axis; and optical wavelength-division demultiplexing means for receiving light output by said optical Kerr medium, separating said time-division multiplexed signal pulses of frequency $\upsilon s$ from control pulses of frequencies $\upsilon_1, \upsilon_2, \ldots, \upsilon_N$; and outputting a second optical pulse stream of wavelength-division multiplexed pulses to replace said first optical pulse stream of time-division multiplexed pulses.

10. An all-optical conversion circuit for converting time-division multiplexed signal to wavelength-division multiplexed signal according to claim 9, wherein said optical power adjusting means include an optical amplifier for providing a signal power amplification sufficient to enable said stream of time-division multiplexed signal pulses to induce cross-phase modulation on said control pulse in the optical Kerr medium.

11. An all-optical conversion circuit for converting time-division multiplexed signal to wavelength-division multiplexed signal according to claim 9, wherein said optical Kerr medium has a positive nonlinear-index coefficient, and said control pulse is a down-chirped pulse whose optical frequency decreases monotonically from a leading end to a trailing end of a control pulse waveform.

12. An all-optical conversion circuit for converting time-division multiplexing to wavelength-division multiplexing according to claim 9, wherein said optical Kerr medium has a negative nonlinear-index coefficient, and said control pulse is an up-chirped pulse whose optical frequency increases monotonically from a leading end to a trailing end of a control pulse waveform.

13. An all-optical conversion circuit for converting time-division multiplexing to wavelength-division multiplexing according to claim 9, wherein said optical Kerr medium is a bi-refringent optical medium and includes a polarization mode dispersion compensation device to compensate polarization mode dispersion between two orthogonal principal axes, and a control light source produces control pulses whose polarization components in the two orthogonal directions have equal powers in said optical 2 bi-refringent Kerr medium.

14. An all-optical conversion circuit for converting time-division multiplexed signal to wavelength-division multiplexed signal according to claim 13, wherein said polarization mode dispersion compensation device is comprised by connecting two bi-refringent Kerr media of an equal length in series so that a principal axis of each medium is at right angles to each other.

15. An all-optical conversion circuit for converting time-division multiplexed signal to wavelength-division multiplexed signal according to claim 13, said polarization mode dispersion compensation device is comprised by connecting two bi-refringent Kerr media of an equal length in series in such a way that a $\lambda/2$ plate is inserted between said two bi-refringent Kerr media.

16. An all-optical conversion circuit for converting time-division multiplexing to wavelength-division multiplexing according to claim 13, wherein polarization mode dispersion compensation device is comprised by connecting two bi-refringent Kerr media of an equal length in series in such a way that a 90 degree Faraday rotator is inserted between said two bi-refringent Kerr media.

* * * * *